US010118647B2

(12) United States Patent
Yoshida et al.

(10) Patent No.: US 10,118,647 B2
(45) Date of Patent: Nov. 6, 2018

(54) VEHICLE BODY STRUCTURE

(71) Applicant: HONDA MOTOR CO., LTD., Tokyo (JP)

(72) Inventors: Masayasu Yoshida, Saitama (JP); Tomohito Kamada, Saitama (JP); Kiyohiko Matsuoka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/558,447

(22) PCT Filed: Mar. 11, 2016

(86) PCT No.: PCT/JP2016/057747
§ 371 (c)(1),
(2) Date: Sep. 14, 2017

(87) PCT Pub. No.: WO2016/148057
PCT Pub. Date: Sep. 22, 2016

(65) Prior Publication Data
US 2018/0065676 A1    Mar. 8, 2018

(30) Foreign Application Priority Data

Mar. 17, 2015   (JP) ................................ 2015-053122
Mar. 17, 2015   (JP) ................................ 2015-053123

(51) Int. Cl.
*B62D 21/15*   (2006.01)
*B62D 25/20*   (2006.01)
(Continued)

(52) U.S. Cl.
CPC ........... *B62D 21/155* (2013.01); *B62D 21/15* (2013.01); *B62D 25/145* (2013.01); *B62D 25/20* (2013.01);
(Continued)

(58) Field of Classification Search
CPC .... B62D 21/15; B62D 21/155; B62D 25/145; B62D 25/20; B62D 25/2045; B62D 27/02
(Continued)

(56) References Cited

U.S. PATENT DOCUMENTS

| | | | |
|---|---|---|---|
| 6,688,676 B1 | 2/2004 | Sato | |
| 2008/0084092 A1* | 4/2008 | Yokoi | B62D 25/2018 296/203.02 |

(Continued)

FOREIGN PATENT DOCUMENTS

| | | |
|---|---|---|
| JP | 6-144299 | 5/1994 |
| JP | 10-45034 | 2/1998 |

(Continued)

OTHER PUBLICATIONS

International Search Report, dated Jun. 7, 2016 (Jun. 7, 2016), Application No. PCT/JP2016/057747, 4 pages.

*Primary Examiner* — Gregory A Blankenship
(74) *Attorney, Agent, or Firm* — Rankin, Hill & Clark LLP

(57) ABSTRACT

A vehicle body structure having an increased capability to absorb impact in a front end of a tunnel member. The vehicle body structure includes a dash lower panel, a dash cross member and the tunnel member. The dash cross member has a convex shape with a central portion located forward of both ends in the vehicle width direction in plan view. The tunnel member has a tunnel closed cross-sectional portion constituting a part of the central portion of the dash cross member, a front fragile portion provided forward of the tunnel closed cross-sectional portion, and a rear tunnel member provided rearward of the tunnel closed cross-sectional portion. The front fragile portion has a lower compressive strength than that of the rear tunnel member, against a load from the front.

7 Claims, 29 Drawing Sheets

(51) Int. Cl.
  *B62D 25/14* (2006.01)
  *B62D 27/02* (2006.01)
  *B62D 29/00* (2006.01)

(52) U.S. Cl.
  CPC .......... *B62D 25/2045* (2013.01); *B62D 27/02* (2013.01); *B62D 29/007* (2013.01)

(58) Field of Classification Search
  USPC .... 296/203.01, 203.02, 204, 187.08, 187.09, 296/191, 192, 193.02, 193.07, 199, 70, 72
  See application file for complete search history.

(56) References Cited

U.S. PATENT DOCUMENTS

| | | | | |
|---|---|---|---|---|
| 2012/0001456 | A1* | 1/2012 | Naoi | B62D 25/2045 296/193.09 |
| 2013/0088048 | A1* | 4/2013 | Ichikawa | B62D 25/08 296/203.02 |
| 2013/0099527 | A1* | 4/2013 | Naoi | B62D 25/14 296/203.02 |
| 2015/0008703 | A1 | 1/2015 | Furusaki et al. | |
| 2015/0145284 | A1* | 5/2015 | Nishida | B62D 25/2036 296/187.1 |
| 2016/0052561 | A1* | 2/2016 | Atsumi | B62D 25/2045 296/187.08 |
| 2016/0236714 | A1* | 8/2016 | Tatsuwaki | B62D 25/14 |
| 2017/0001669 | A1* | 1/2017 | Ohigashi | B62D 25/088 |
| 2017/0080978 | A1* | 3/2017 | Yoshida | B62D 21/155 |
| 2018/0065676 | A1* | 3/2018 | Yoshida | B62D 25/20 |
| 2018/0065686 | A1* | 3/2018 | Maier | B62D 25/20 |
| 2018/0208250 | A1* | 7/2018 | Sasakura | B62D 25/2018 |

FOREIGN PATENT DOCUMENTS

| | | |
|---|---|---|
| JP | 2001-225766 | 8/2001 |
| JP | 2011-201331 | 10/2011 |
| JP | 2012-131372 | 7/2012 |
| JP | 2013-169806 | 9/2013 |

* cited by examiner

VEHICLE BODY STRUCTURE

TECHNICAL FIELD

The present invention relates to a vehicle body structure, particularly to a vehicle body structure around a dash lower panel.

BACKGROUND ART

For example, Patent Document 1 discloses a vehicle body lower structure including left and right side sills extending in a vehicle front-rear direction along outer ends in a vehicle width direction of a vehicle body, wherein the vehicle body lower structure includes a dashboard cross member (dash cross member) connected to front ends of the left and right side sills and extending in the vehicle width direction, and outriggers connected to rear ends of front side frames and the front ends of the left and right side sills and extending in the vehicle width direction, and a dashboard lower (dash lower panel) having a wheel housing portion (wheel arch-shaped portion) is joined to the dashboard cross member and the outrigger to be sandwiched therebetween. With this vehicle body lower structure, an amount of backward movement of the dashboard lower when a narrow offset collision load is applied thereto is reduced.

CITATION LIST

Patent Literature

Patent Document 1: Japanese Patent Application Publication No. 2013-169806 (Claim 1, FIG. 1)

SUMMARY OF INVENTION

Technical Problem

In a conventional example described above, a front end of a tunnel member connected to a central portion in the vehicle width direction of the dash lower panel is reinforced by the dash cross member. Therefore, when an engine moves backward at the time of front collision, there is a possibility that the front end of the tunnel member interferes with the engine and large deceleration is applied to an occupant.

Further, in the vehicle body lower structure of Patent Document 1, a vertical member extends vertically at a center of the dashboard lower. However, it is difficult to sufficiently suppress vibration of the engine only by reinforcing the center of the dashboard lower with the vertical member. Therefore, it is necessary to increase a plate thickness of the dash lower panel or increase the number of damping materials, resulting in an increase in weight and cost.

The present invention has been made in view of the above points, and an object of the present invention is to provide a vehicle body structure having an increased capability to absorb impact in the front end of the tunnel member. Further, another object of the present invention is to provide a vehicle body structure capable of reducing vibration of the dash lower panel while suppressing an increase in plate thickness of the dash lower panel and in the number of damping materials.

Solution to Problem

In order to achieve the above objects, a vehicle body structure according to the present invention includes a dash lower panel for partitioning a power source device chamber and a vehicle compartment, a dash cross member provided on the dash lower panel and constituting a closed cross-section extending in a vehicle width direction, and a tunnel member provided at a central portion in the vehicle width direction of the dash lower panel and extending in a front-rear direction in a groove shape opening downwardly, wherein the dash cross member has a convex shape with a central portion located forward of both ends in the vehicle width direction in plan view, the tunnel member has a tunnel closed cross-sectional portion constituting a part of the central portion of the dash cross member, a front fragile portion provided in front of the tunnel closed cross-sectional portion, and a tunnel main body provided behind the tunnel closed cross-sectional portion, and the front fragile portion has a lower compressive strength than that of the tunnel main body against a load from front.

With this configuration, since the dash cross member has a convex shape with a central portion located forward of both ends in the vehicle width direction in plan view, for example, when a power source device moves backward due to a full flat collision or the like, the central portion of the dash cross member is first pressed by the power source device. Then, the front fragile portion provided in front of the tunnel closed cross-sectional portion has a lower compressive strength than that of the tunnel main body provided behind the tunnel closed cross-sectional portion against the load from the front, and thus it is possible to absorb collision energy by crush of the front fragile portion prior to the tunnel main body when the power source device moves backward. Therefore, deceleration applied to the occupant can be reduced.

Preferably, the dash cross member includes a panel closed cross-section forming member joined to a surface on a vehicle compartment side of the dash lower panel on both sides of the tunnel member and forming a closed cross-section along with the dash lower panel, and a tunnel closed cross-section forming member joined to a surface opposite to the vehicle compartment side of the tunnel member and forming a closed cross-section along with the tunnel member, and the tunnel closed cross-section forming member is joined to the panel closed cross-section forming member via a side wall of the tunnel member.

With this configuration, since the panel closed cross-section forming member is joined to the surface on the vehicle compartment side of the dash lower panel, and the tunnel closed cross-section forming member is joined to the surface opposite to the vehicle compartment side of the tunnel member, a vertical offset amount between the closed cross-section formed by the panel closed cross-section forming member and the closed cross-section formed by the tunnel closed cross-section forming member is reduced. Therefore, bending strength of the dash cross member can be increased.

Preferably, the tunnel member has a rear fragile portion provided between the tunnel closed cross-sectional portion and the tunnel main body, and the rear fragile portion has a lower compressive strength than that of the tunnel main body against the load from the front.

With this configuration, since the tunnel member has the rear fragile portion, which is provided between the tunnel closed cross-sectional portion and the tunnel main body and has a lower compressive strength than that of the tunnel main body against the load from the front, an amount of collision energy absorption is increased along with the front fragile portion. Therefore, deceleration applied to the occupant can be further reduced.

Preferably, the panel closed cross-section forming member includes a pair of vehicle width direction members disposed in the vehicle width direction at both ends in the vehicle width direction of the tunnel member and a pair of rear inclined members respectively connected to outer ends of the vehicle width direction members and located rearwardly toward an outer side in the vehicle width direction, and the pair of vehicle width direction members is connected by the tunnel closed cross-section forming member.

With this configuration, the pair of vehicle width direction members is connected by the tunnel closed cross-section forming member, and the outer ends of the pair of vehicle width direction members are supported by the pair of rear inclined members acting as a brace.

Therefore, when the power source device moves backward by front collision, the central portion of the dash cross member formed by the pair of vehicle width direction members and the tunnel closed cross-section forming member is easily bent rearwardly in an arch shape, so that deformation of the front fragile portion is promoted. Therefore, deceleration applied to the occupant can be further reduced.

The vehicle width direction member preferably has a lower bending strength than that of the rear inclined member against the load from the front.

With this configuration, since the vehicle width direction member has a lower bending strength than that of the rear inclined member against the load from the front, the central portion of the dash cross member formed by the pair of vehicle width direction members and the tunnel closed cross-section forming member is further easily bent rearwardly in an arch shape.

Preferably, the tunnel member includes a front tunnel member joined to the dash lower panel and inclined to be located higher toward the front, and a rear tunnel member connected to a rear end of the front tunnel member and extending substantially horizontally to constitute the tunnel main body, and the tunnel closed cross-sectional portion and the front fragile portion are provided in the front tunnel member.

With this configuration, since the tunnel closed cross-sectional portion and the front fragile portion are provided in the front tunnel member inclined to be located higher toward the front, deformation of the front fragile portion is promoted. Further, since the rear tunnel member constituting the tunnel main body is connected to the rear end of the front tunnel member and extends substantially horizontally, deformation thereof is suppressed. Therefore, it is possible to promote absorption of the collision energy and to suppress deformation of the vehicle compartment.

Preferably, the vehicle body structure further includes a pedal bracket for supporting a pedal of a vehicle, and the pedal bracket is joined to the dash lower panel vertically across the vehicle width direction member and has a clearance in the front-rear direction with respect to the vehicle width direction member.

With this configuration, since the pedal bracket is joined to the dash lower panel vertically across the vehicle width direction member and has a clearance in the front-rear direction with respect to the vehicle width direction member, it is possible to suppress the vehicle width direction member from interfering with the pedal bracket when the dash cross member is bent rearward in an arch shape.

Preferably, the dash lower panel has a wheel arch-shaped portion constituting a part of a wheel arch, the vehicle body structure further includes a reinforcing panel for covering the wheel arch-shaped portion from the vehicle compartment side, and the rear inclined member is formed integrally with the reinforcing panel.

With this configuration, since the rear inclined member is formed integrally with the reinforcing panel, it is possible to improve function of supporting the central portion of the dash cross member as a brace. Therefore, the central portion of the dash cross member is easily bent.

Preferably, a bead-shaped portion is formed on an upper wall of the tunnel member so that a surface thereof on the vehicle compartment side rises along the tunnel closed cross-section forming member and a surface thereof opposite to the vehicle compartment side is recessed, and a closed cross-section is formed by the bead-shaped portion and the tunnel closed cross-section forming member.

With this configuration, since the closed cross-section is formed on the upper wall of the tunnel member by the bead-shaped portion and the tunnel closed cross-section forming member, rigidity of the tunnel closed cross-sectional portion is increased. Therefore, it is possible to promote deformation of the front fragile portion provided in front of the tunnel closed cross-sectional portion.

Further, the vehicle body structure according to the present invention includes the dash lower panel for partitioning the power source device chamber and the vehicle compartment, the tunnel member provided at the central portion in the vehicle width direction of the dash lower panel and extending in the front-rear direction, a vertical member extending upwardly from a front end of the tunnel member and joined to the dash lower panel, a pair of left and right upper lateral members extending outwardly in the vehicle width direction from the vertical member and joined to the dash lower panel, and a front side frame extending in the front-rear direction in the power source device chamber and having a rear end joined to the dash lower panel, wherein at least one of outer ends in the vehicle width direction of the upper lateral members overlaps the rear end of the front side frame in the vehicle width direction.

With this configuration, since at least one of outer ends in the vehicle width direction of the upper lateral members overlaps the rear end of the front side frame in the vehicle width direction, rigidity of the dash lower panel around the rear end of the front side frame is increased by the outer end in the vehicle width direction of the upper lateral member. This makes it possible to reduce vibration of the dash lower panel and the front side frame while suppressing an increase in plate thickness of the dash lower panel and an increase in the number of attached damping materials.

Preferably, the tunnel member is formed in a groove shape opening downwardly and has a pair of left and right tunnel ridge lines extending in the front-rear direction on an upper surface thereof, the vertical member includes a pair of left and right vertical members disposed separately in the vehicle width direction, and lower ends of the pair of left and right vertical members are abutted against and joined to the pair of left and right tunnel ridge lines.

With this configuration, since the tunnel member is formed in a groove shape opening downwardly and has a pair of left and right tunnel ridge lines extending in the front-rear direction on the upper surface thereof, it is possible to sufficiently reinforce the dash lower panel even when a cross-section and a plate thickness of the vertical member is reduced. Further, since the lower ends of the pair of left and right vertical members are abutted against and joined to the pair of left and right tunnel ridge lines, and the pair of left and right vertical members is disposed separately in the vehicle width direction, it is possible to improve steering feeling given to the occupant by allowing deformation of the central portion of the dash lower panel.

Preferably, one of the upper lateral members comprises a master cylinder mounting bracket disposed on an outer side in the vehicle width direction and for mounting a brake master cylinder, and a brace for connecting the master cylinder mounting bracket and the vertical member.

With this configuration, since the master cylinder mounting bracket is connected to the vertical member via the brace, mounting strength of the brake master cylinder is increased.

Preferably, another of the upper lateral members is integrally formed by a lateral bone formed in a groove shape opening toward the dash lower panel and extending in the vehicle width direction, and a plate-like damping portion extending along the dash lower panel from the lateral bone and attached with a damping member.

With this configuration, since the other of the upper lateral members integrally includes the lateral bone and the damping portion, productivity and damping performance of the other of the upper lateral members are improved.

Preferably, the vehicle body structure further includes a joint cover for covering a gap between the dash lower panel and a steering shaft passing through the dash lower panel from a side of the power source device chamber, and the joint cover is joined to the master cylinder mounting bracket and the brace with the dash lower panel interposed therebetween.

With this configuration, since the joint cover is joined to the master cylinder mounting bracket and the brace with the dash lower panel interposed therebetween, damping performance can be improved by reducing reduction of rigidity due to an opening of the dash lower panel.

Preferably, the vehicle body structure further includes a reinforcing panel for covering a wheel arch-shaped portion provided on an end in the vehicle width direction of the dash lower panel from the vehicle compartment side, and a lower lateral member connecting the reinforcing member and the tunnel member to constitute the dash cross member, and the joint cover is joined to the reinforcing panel and the lower lateral member with the dash lower panel interposed therebetween.

With this configuration, since the joint cover is joined to the reinforcing panel and the lower lateral member with the dash lower panel interposed therebetween, damping performance can be further improved by further reducing reduction of rigidity due to an opening of the dash lower panel.

Preferably, the vehicle body structure further includes a dash upper panel provided above the dash lower panel and extending in the vehicle width direction in a groove shape opening upwardly, wherein the dash upper panel has a rear inclined surface located higher toward rear, and an upper end of the vertical member is joined to the rear inclined surface.

With this configuration, since the upper end of the vertical member is joined to the rear inclined surface located higher toward the rear, it is possible to suppress vibration in the front-rear direction and the vertical direction.

Advantageous Effects of Invention

According to the present invention, it is possible to provide a vehicle body structure having an increased capability to absorb impact in a front end of a tunnel member. Further, according to the present invention, it is possible to provide a vehicle body structure capable of reducing vibration of a dash lower panel while suppressing an increase in plate thickness of the dash lower panel and in the number of damping materials.

DESCRIPTION OF EMBODIMENTS

Figure 1:
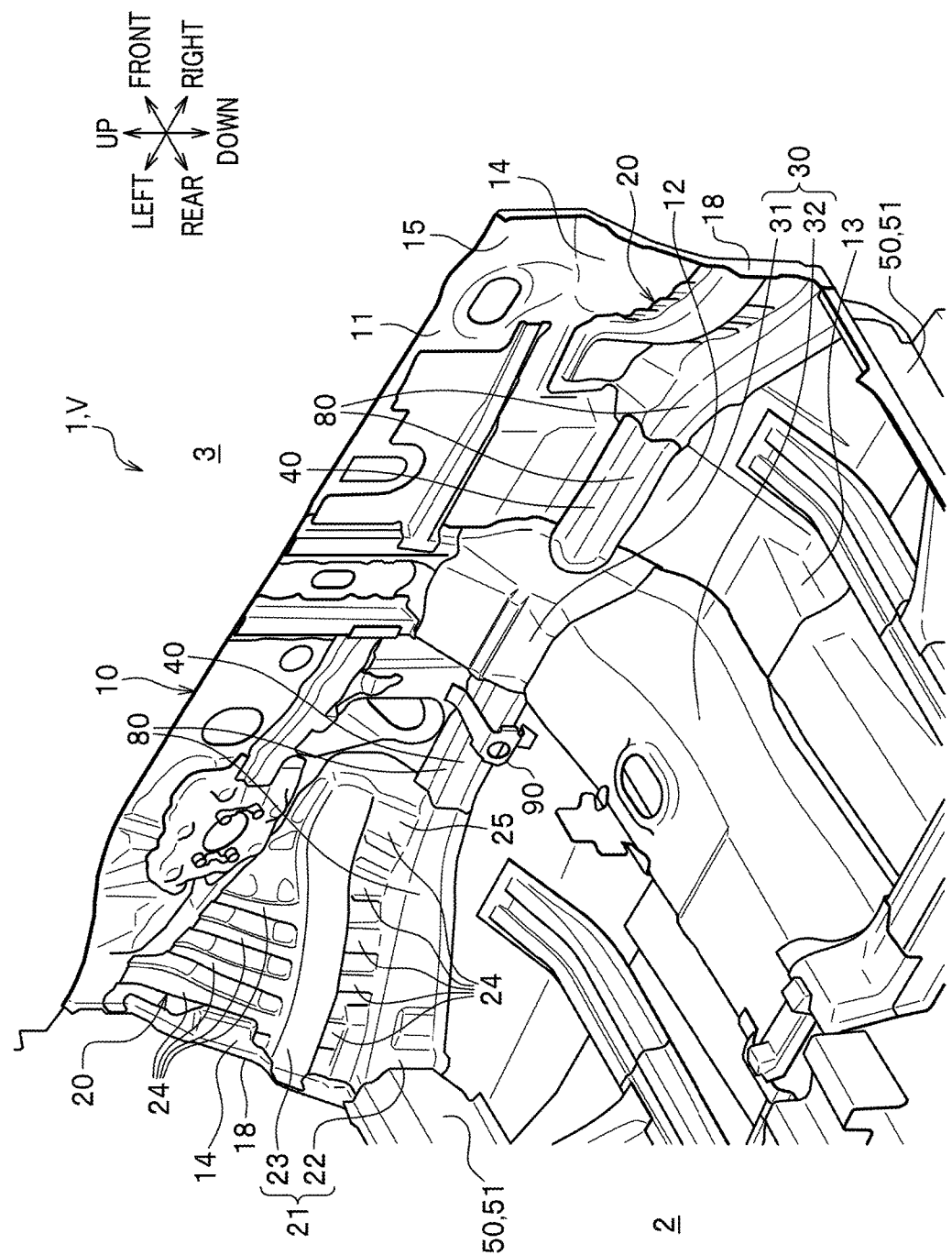
FIG. 1 is a perspective view of a vehicle body structure according to an embodiment of the present invention viewed from right rear upper.

Embodiments of the present invention will be described in detail with reference to the drawings. The same components are denoted by the same reference numerals, and redundant description will be omitted. When directions are described, they are described based on front, rear, left, right, up and down directions when viewed from a driver's seat. Further, "vehicle width direction" is synonymous with "left-right direction".

Figure 2:
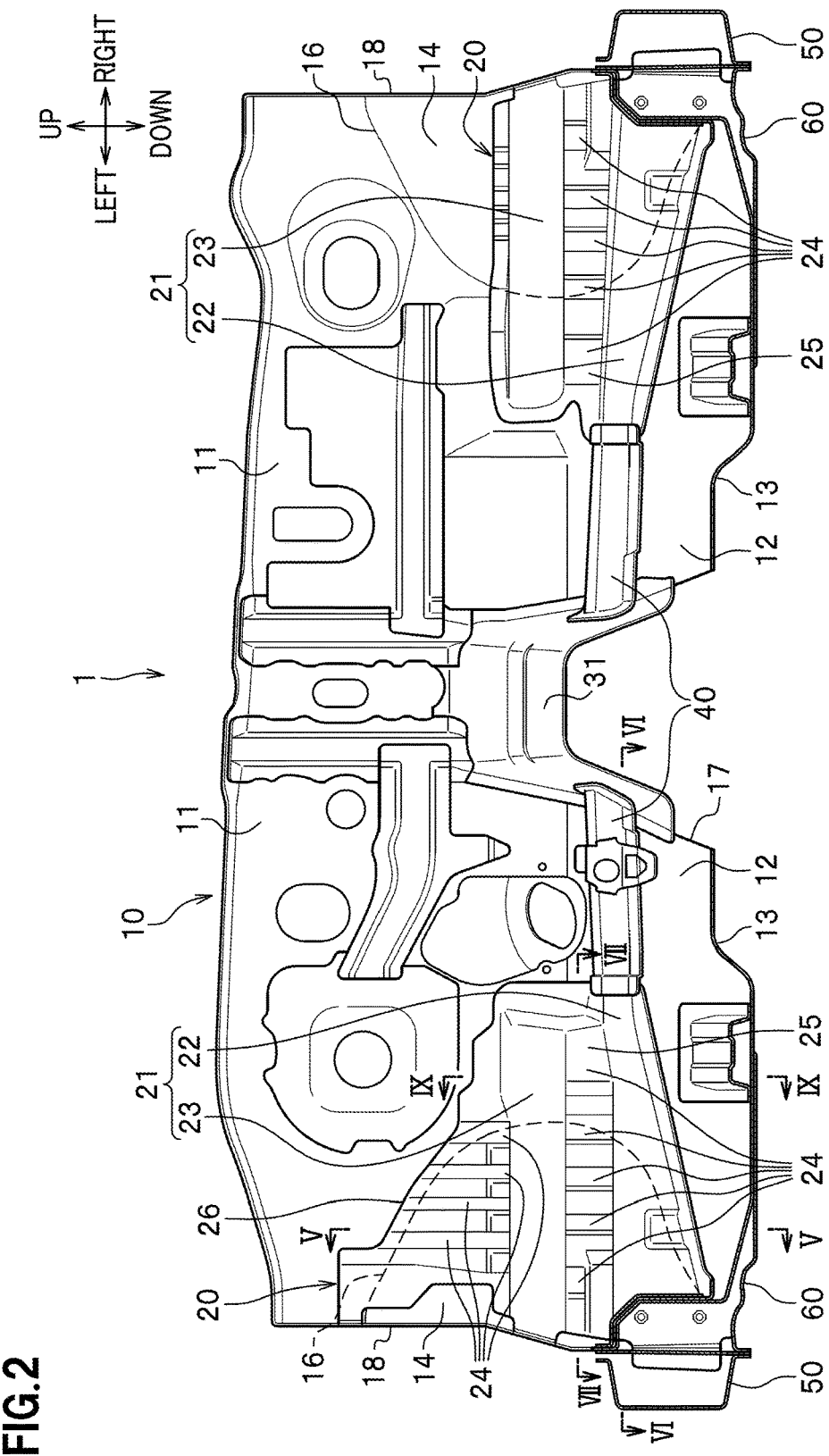
FIG. 2 is a rear view of the vehicle body structure viewed from rear.
Figure 3:
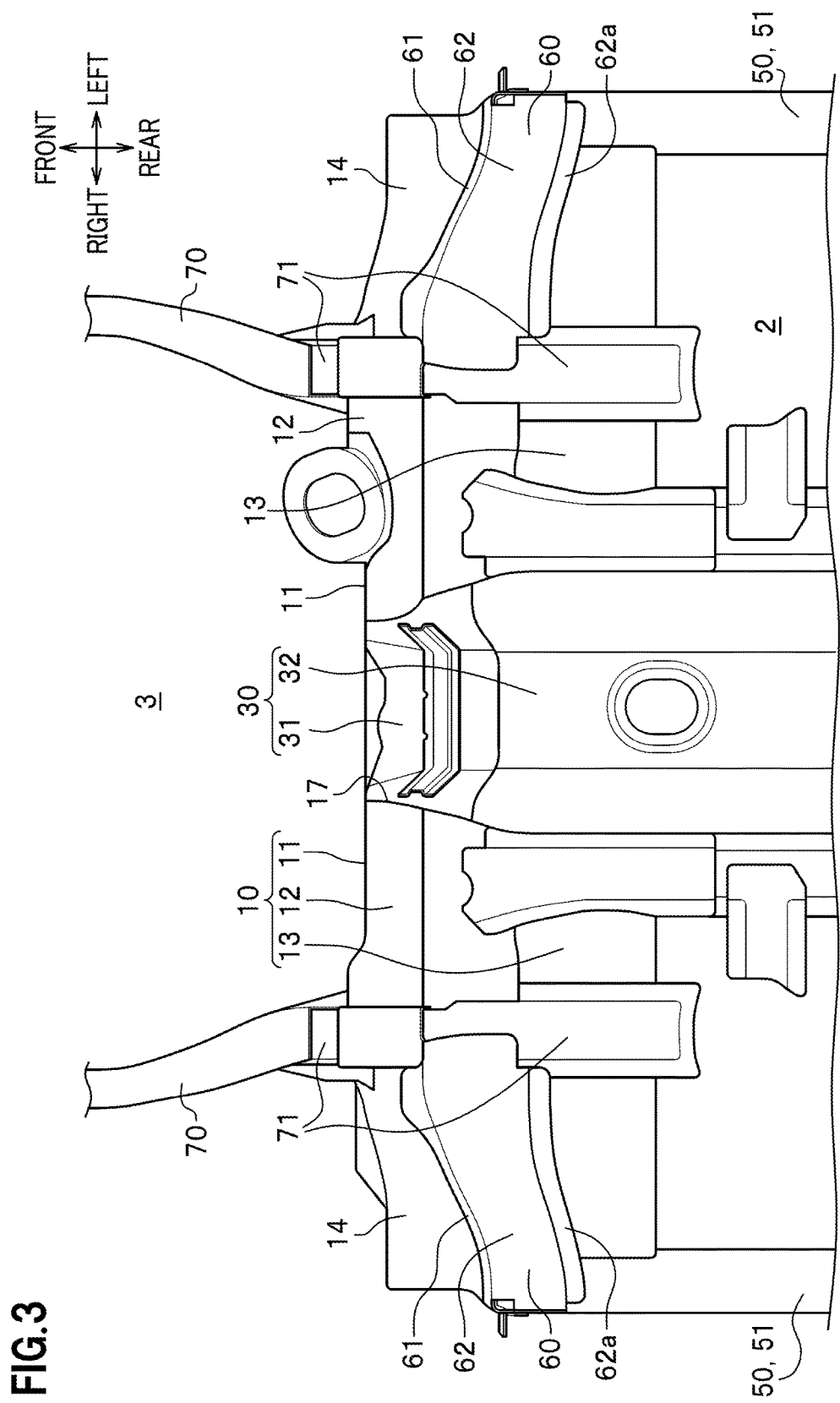
FIG. 3 is a bottom view of the vehicle body structure viewed from below.

As shown in FIGS. 1, 2, 3, an automobile V including a vehicle body structure 1 according to a first embodiment mainly includes a dash lower panel 10 to form a front end of a vehicle compartment 2, a reinforcing panel 20 for covering a part of the dash lower panel 10 from a side of the vehicle compartment 2, a side sill 50 having a front end connected to an end in the vehicle width direction of the dash lower panel 10 and extending in a front-rear direction, a tunnel member 30 connected to a central portion in the vehicle width direction of the dash lower panel 10, and a dash cross member 80 provided on the dash lower panel 10 and constituting a closed cross-section extending in the vehicle width direction. Since the vehicle body structure 1 is formed substantially bilaterally symmetrically, a left side (driver's seat side) structure will be mainly described in the following description.

The dash lower panel 10 is a plate member for partitioning a power source device chamber 3 on a front side and the vehicle compartment 2 on a rear side, and is formed by bending a high-tensile steel plate into a predetermined shape, for example, by press molding. The dash lower panel 10 mainly includes a front plate 11 extending vertically and in the vehicle width direction, an inclined portion 12 extending rearwardly and inclined downwardly from a lower end of the front plate 11, a floor plate 13 extending rearwardly and substantially horizontally from a lower end of the inclined portion 12, and a pair of wheel arch-shaped portions 14 formed on both ends in the vehicle width direction of the dash lower panel 10. In the following description, a portion other than the wheel arch-shaped portions 14 of the dash lower panel 10 is referred to as a "general portion 15" in some cases.

The wheel arch-shaped portion 14 is a portion constituting a part of a wheel arch (not shown) for covering an upper half of a front wheel of the automobile V. The wheel arch-shaped portion 14 is formed in a spherical shape bulging toward the vehicle compartment 2, and is provided so as to straddle the front plate 11 and the inclined portion 12. A ridge line 16 which is a boundary between the wheel arch-shaped portion 14 and the general portion 15 (mainly the front plate 11) is formed of a folded line (ridge line) formed by bending the dash lower panel 10, and extends in an arc shape in rear view (see FIG. 2).

The dash lower panel 10 has a recessed cutting out portion 17 opening downward at a central portion thereof in the vehicle width direction. The cutting out portion 17 is formed across the front plate 11, the inclined part 12 and the floor plate 13. The tunnel member 30 described below is joined to the cutting out portion 17. Further, the dash lower panel 10 has a dash flange 18 extending rearwardly from the both ends thereof in the vehicle width direction. The dash flange 18 is formed across the front plate 11, the wheel arch-shaped portion 14, the inclined part 12 and the floor plate 13. The side sill 50 and a front pillar lower 4 (see FIG. 8) are joined to the dash flange 18. A floor panel is joined to a rear end of the floor plate 13.

As shown in FIGS. 1, 2, 4 to 7, the reinforcing panel 20 is a pair of left and right plate members for respectively covering and reinforcing the wheel arch-shaped portions 14 from the side of the vehicle compartment 2. The reinforcing panel 20 is formed into a predetermined complicated shape by forming a curved shape or an uneven shape in the high-tensile steel plate, for example, by hot-stamp molding. A vehicle inner end of the reinforcing panel 20 covers a part of the front plate 11 and the inclined part 12 beyond the wheel arch-shaped portion 14 from the side of the vehicle compartment 2. The reinforcing panel 20 has a lateral closed cross-sectional portion 21 extending in the vehicle width direction and a vertical closed cross-sectional portion 24 extending vertically.

The lateral closed cross-sectional portion 21 is a portion to form a closed cross-section extending in the vehicle width direction along with the wheel arch-shaped portion 14. The lateral closed cross-sectional portion 21 is formed by allowing a part of the reinforcing panel 20 to bulge toward the vehicle compartment 2. In the present embodiment, the lateral closed cross-sectional portion 21 includes a first lateral closed cross-sectional portion 22 on a lower side and a second lateral closed cross-sectional portion 23 provided upwardly spaced from the first lateral closed cross-sectional portion 22. The number of the lateral closed cross-sectional portions 21 is not particularly limited.

Figure 4:
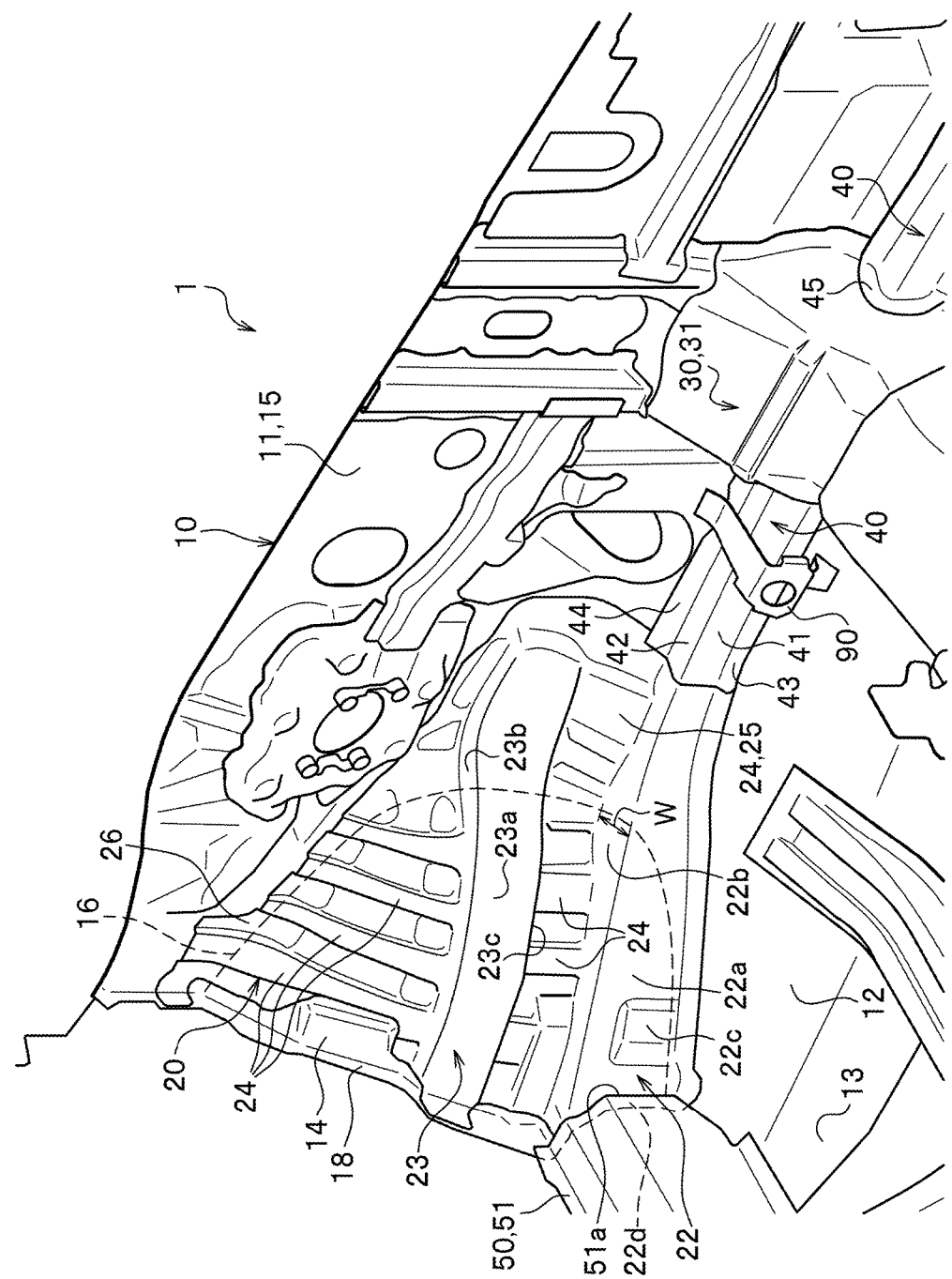
FIG. 4 is a perspective view showing an enlarged left half of the vehicle body structure of FIG. 1.
Figure 5:
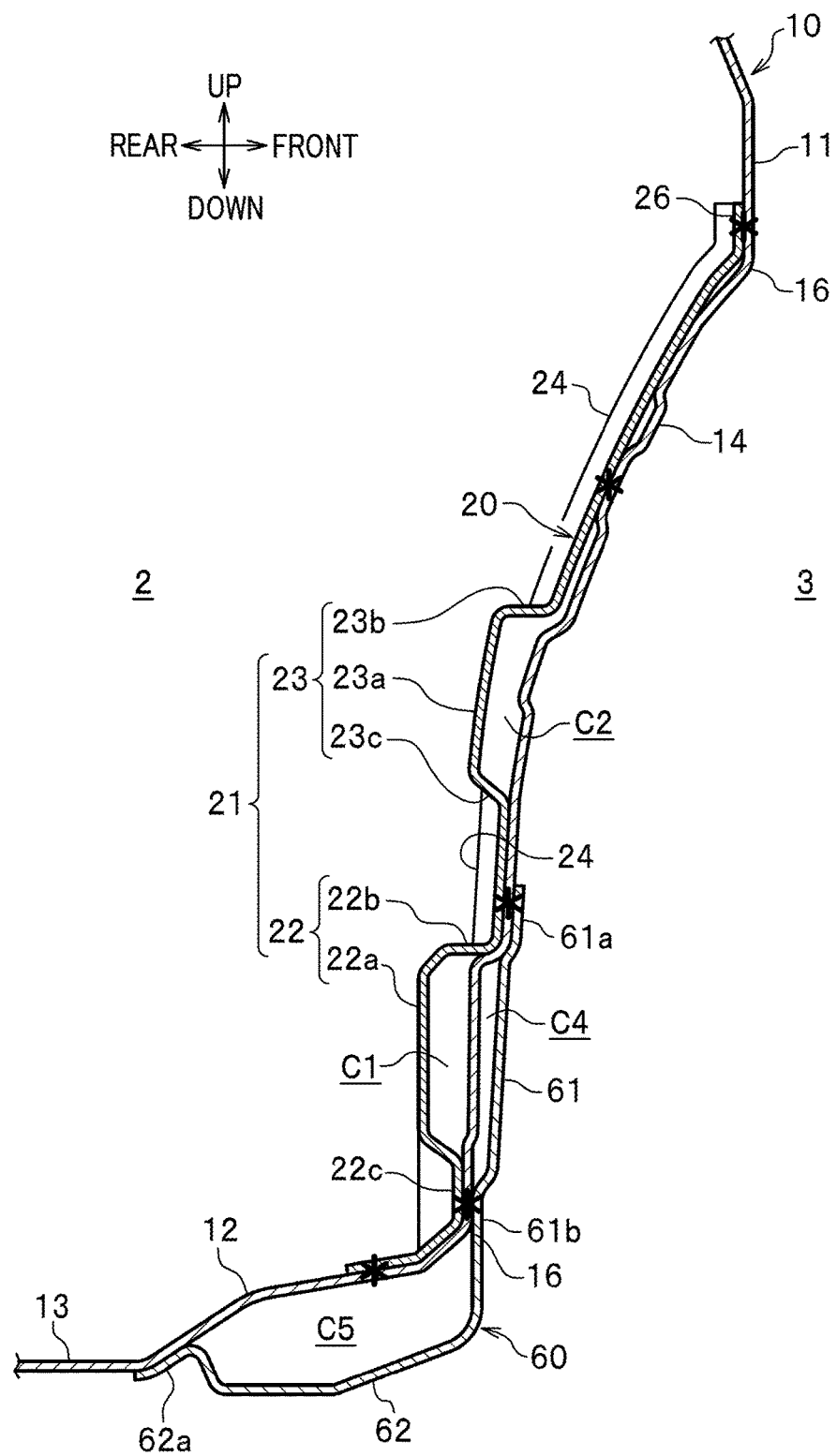
FIG. 5 is a vertical cross-sectional view taken along a line V-V of FIG. 2.
Figure 6:
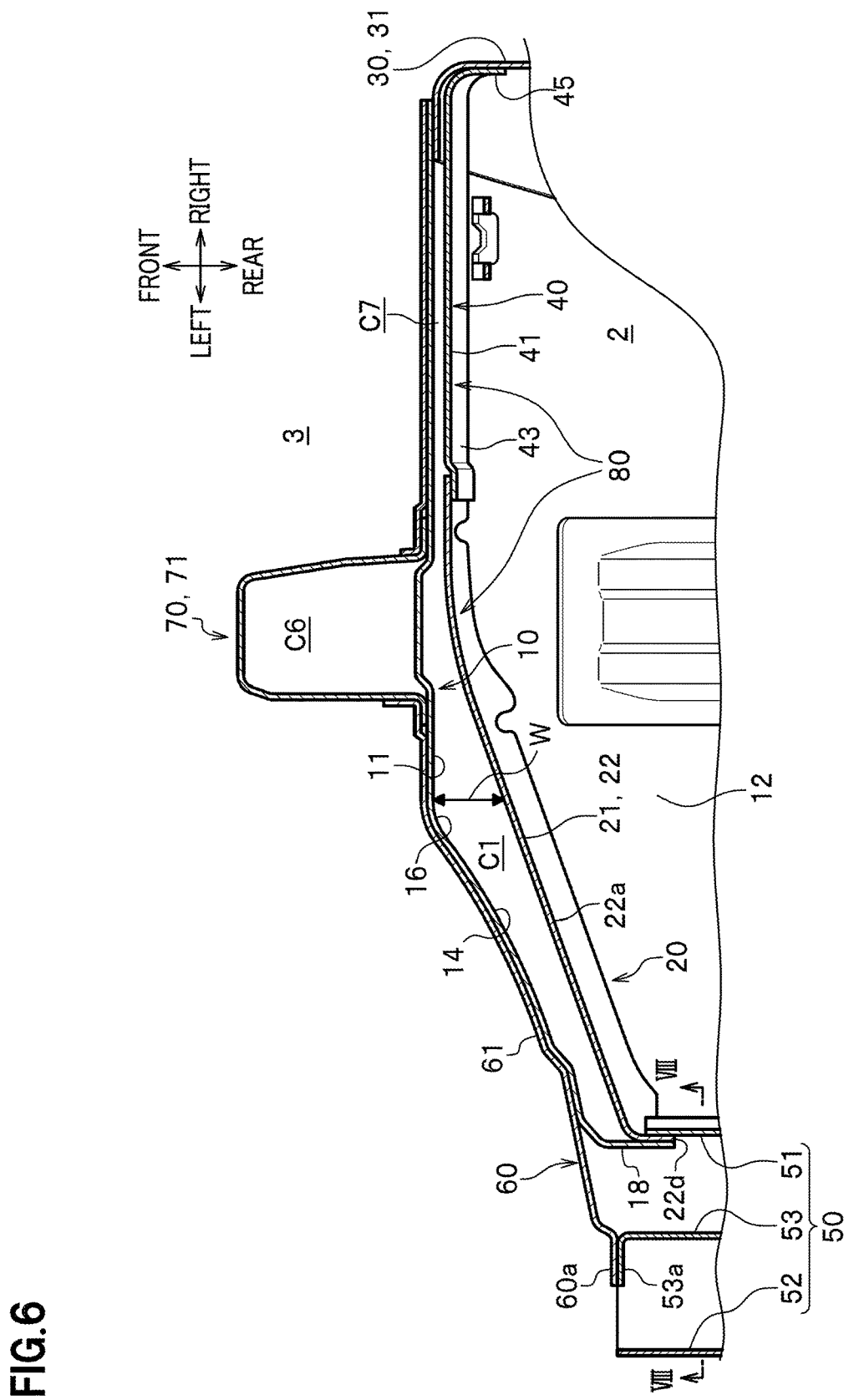
FIG. 6 is a horizontal cross-sectional view taken along a line VI-VI of FIG. 2.

As shown in FIGS. 4, 5, 6, the first lateral closed cross-sectional portion 22 is formed in a substantially inverted L shape, and has a vertical wall 22a extending vertically and an upper wall 22b extending forwardly from an upper end of the vertical wall 22a. The first lateral closed cross-sectional portion 22 extends along the ridge line 16, which is a boundary between the wheel arch-shaped portion 14 and the inclined portion 12, under the wheel arch-shaped portion 14. The reinforcing panel 20 is joined to the dash lower panel 10 on an upper side and a lower side of the first lateral closed cross-sectional portion 22, for example, by spot welding. Thus, a first lateral closed cross-section C1 surrounded by the first lateral closed cross-sectional portion 22 and the wheel arch-shaped portion 14 is formed, and a lower part of the wheel arch-shaped portion 14 is reinforced. Further, a recessed portion 22c for welding is provided in the vicinity of an end on a vehicle outer side of the vertical wall 22a. A lateral flange 22d bent rearwardly is provided on an outer end in the vehicle width direction of the first lateral closed cross-sectional portion 22. The lateral flange 22d is joined to the dash flange 18 from the side of the vehicle compartment 2. The first lateral closed cross-sectional portion 22 of the reinforcing panel 20 corresponds to a part of a "panel closed cross-section forming member" and a "rear inclined member" in claims.

As shown in FIGS. 4, 5, the second lateral closed cross-sectional portion 23 is formed in a groove shape opening forward in a vertical cross-sectional view, and has a vertical wall 23a extending vertically, an upper wall 23b extending forwardly from an upper end of the vertical wall 23a, and a lower wall 23c extending forwardly from a lower end of the vertical wall 23a. The second lateral closed cross-sectional portion 23 extends in the vehicle width direction in a substantially vertically middle position of the wheel arch-shaped portion 14. The reinforcing panel 20 is joined to the dash lower panel 10 on an upper side and a lower side of the second lateral closed cross-sectional portion 23, for example, by spot welding (see * in FIG. 5). As a result, a second lateral closed cross-section C2 surrounded by the second lateral closed cross-sectional portion 23 and the wheel arch-shaped portion 14 is formed, so that a middle portion of the wheel arch-shaped portion 14 is reinforced.

Figure 7:
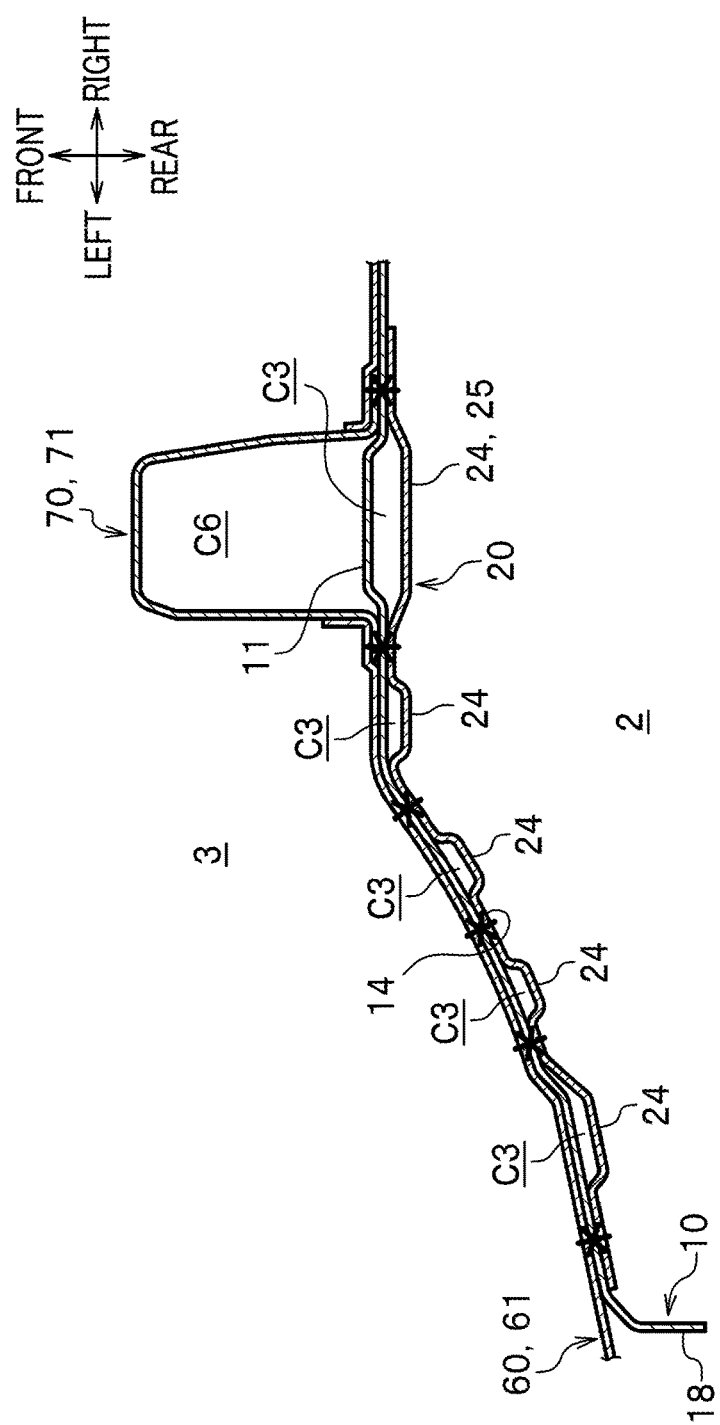
FIG. 7 is a horizontal cross-sectional view taken along a line VII-VII of FIG. 2.

As shown in FIGS. 4, 7, the vertical closed cross-sectional portion 24 is a portion to form a vertical closed cross-section C3 extending vertically along with the wheel arch-shaped portion 14. The vertical closed cross-sectional portion 24 is formed by allowing a part of the reinforcing panel 20 to bulge toward the vehicle compartment 2. In the present embodiment, the vertical closed cross-sectional portion 24 includes a plurality of vertical closed cross-sectional portions 24 separated from each other in the vehicle width direction. The number of the vertical closed cross-sectional portions 24 is not particularly limited. Each vertical closed cross-sectional portion 24 is formed in a groove shape opening forward in a horizontal cross-sectional view. The vertical closed cross-sectional portion 24 has a smaller amount of bulging (groove depth) than that of the lateral closed cross-sectional portion 21. In the following description, a vertical closed cross-sectional portion 24 on the innermost side in the vehicle width direction among the plurality of vertical closed cross-sectional portions 24 is referred to as an "innermost vertical closed cross-sectional portion 25" in some cases.

Each vertical closed cross-sectional portion 24 intersects with the lateral closed cross-sectional portion 21 (is perpendicular to the lateral closed cross-sectional portion 21 in the present embodiment). In particular, each vertical closed cross-sectional portion 24 extends from the upper wall 22b of the first lateral closed cross-sectional portion 22 to the lower wall 23c of the second lateral closed cross-sectional portion 23. Further, the vertical closed cross-sectional portion 24 other than the innermost vertical closed cross-sectional portion 25 extends from the upper wall 23b of the second lateral closed cross-sectional portion 23 to an upper edge 26 of the reinforcing panel 20. The innermost vertical closed cross-sectional portion 25 has a larger width dimension than that of other vertical closed cross-sectional portions 24.

As shown in FIG. 7, the reinforcing panel 20 is joined to the dash lower panel 10 at left and right ends of each vertical closed cross-sectional portion 24, for example, by spot welding (see * in FIG. 7). Thus, a plurality of vertical closed cross-sections C3 respectively surrounded by the vertical closed cross-sectional portions 24 and the wheel arch-shaped portions 14 are formed, so that the wheel arch-shaped portions 14 are reinforced vertically. Further, as shown in FIGS. 4, 5, the upper edge 26 of the reinforcing panel 20 is joined to the front plate 11 on an upper side of the ridge line 16 (on an outer side of the wheel arch-shaped portion 14) which is a boundary between the front plate 11 and the wheel arch-shaped portion 14. As a result, the ridge line 16 is reinforced by the reinforcing panel 20.

As shown in FIGS. 1, 2, 3, the tunnel member 30 is connected to the central portion (cutting out portion 17) in the vehicle width direction of the dash lower panel 10. The tunnel member 30 is a member bent and formed in a groove shape (tunnel shape, inverted U-shape) opening downwardly and projecting upwardly, and extends in the front-rear direction. A propeller shaft, an exhaust pipe and the like (not shown) are housed inside (below) the tunnel member 30. The tunnel member 30 includes a front tunnel member 31 disposed on the front side, a rear tunnel member 32 connected to a rear end of the front tunnel member 31, and a tunnel closed cross-section forming member 33 joined to a surface (hereinafter, also referred to as "rear surface") opposite to the vehicle compartment 2 side of the front tunnel member 31. The tunnel member 30 will be described in detail below.

As shown in FIGS. 1, 4, 6 (mainly FIG. 4), a lateral member 40 formed separately from the reinforcing panel 20 is provided between the reinforcing panel 20 and the tunnel member 30. The lateral member 40 is a member constituting the so-called dash cross member 80 along with the first lateral closed cross-sectional portion 22 which is the lateral closed cross-sectional portion 21 on the lowermost side. The lateral member 40 is formed by bending the high-tensile steel plate into a predetermined shape, for example, by hot-stamp molding. The lateral member 40 is formed in a substantially inverted L shape in a vertical cross-sectional view, and includes a lateral member vertical wall 41 extending vertically, a lateral member upper wall 42 extending forwardly from an upper end of the lateral member vertical wall 41, a lateral member lower flange 43 extending downwardly and rearwardly from a lower end of the lateral member vertical wall 41, a lateral member upper flange 44 extending upwardly and forwardly from a front end of the lateral member upper wall 42, and a lateral member end flange 45 extending from an inner end in the vehicle width direction (on the tunnel member 30 side) of the lateral member 40 toward the vehicle compartment 2 along a side wall of the tunnel member 30. The lateral member 40 corresponds to a part of "panel closed cross-section forming member", "vehicle width direction member" and "lower lateral member" in claims.

The lateral member lower flange 43 is joined to the inclined portion 12 of the dash lower panel 10. The lateral member upper flange 44 is joined to the front plate 11 of the dash lower panel 10. The lateral member end flange 45 is joined to a side wall of the front tunnel member 31. Further, an outer end in the width direction of the lateral member 40 is joined to an inner end in the vehicle width direction of the first lateral closed cross-sectional portion 22. A front end of the side sill 50 described below is joined to an outer end in the vehicle width direction of the first lateral closed cross-sectional portion 22. Thus, the first lateral closed cross-sectional portion 22, the lateral member 40 and the dash lower panel 10 constitute the dash cross member 80 having a hollow shape extending in the vehicle width direction. A closed cross-section C7 formed by the lateral member 40 is continuous with the closed cross-section C1 formed by the first lateral closed cross-sectional portion 22. The dash cross member 80 connects the front end of the side sill 50 and a front end of the tunnel member 30. In other words, a vehicle outer end of the dash cross member 80 is supported by the front end of the side sill 50 and a central portion of the dash cross member 80 is supported by the front end of the tunnel member 30. The dash cross member 80 will be described in detail below.

Figure 8:
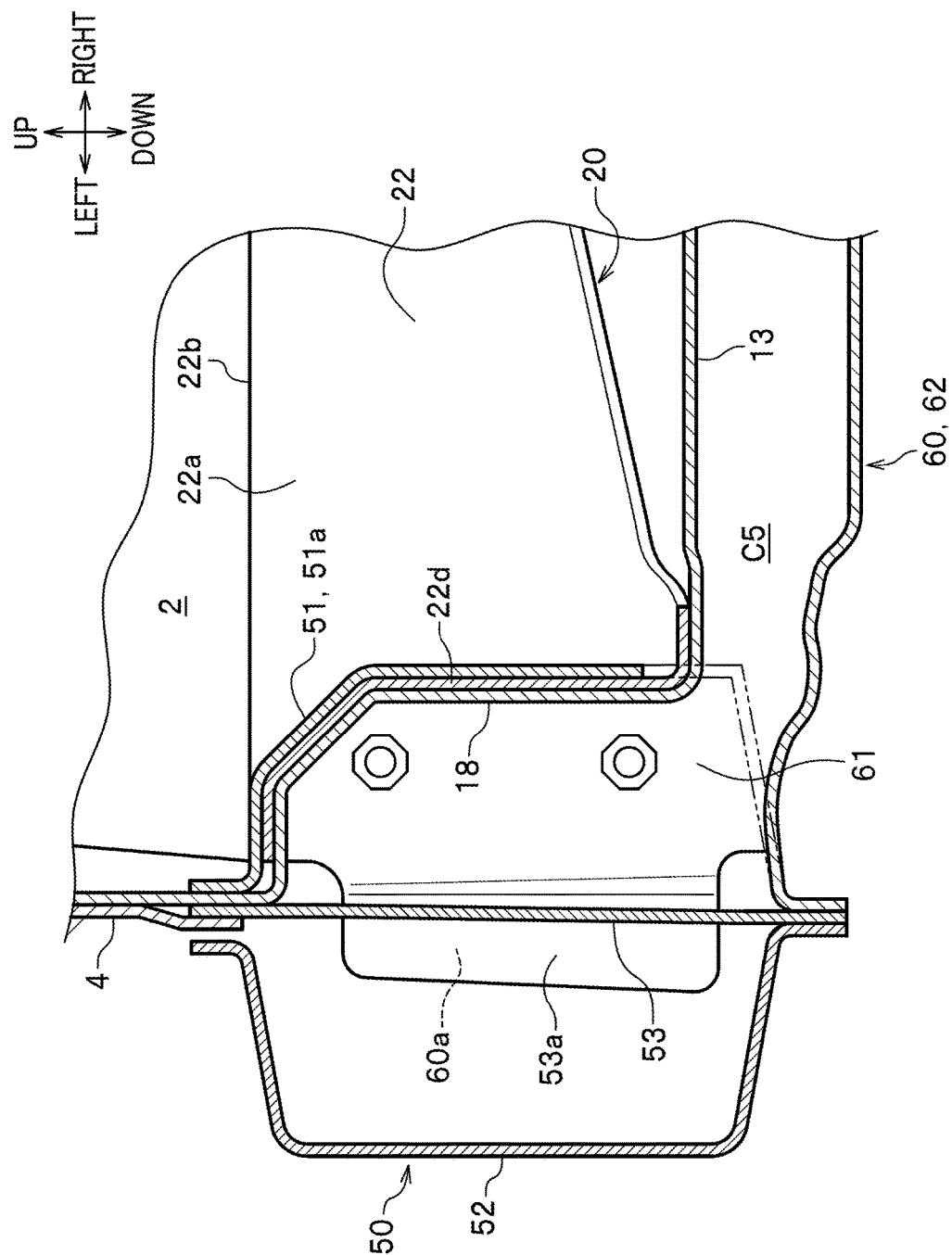
FIG. 8 is a vertical cross-sectional view taken along a line VIII-VIII of FIG. 6.

As shown in FIGS. 4, 6, 8, the front end of the side sill 50 is joined to the end in the vehicle width direction (left or right end) of the dash lower panel 10. The side sill 50 is a hollow member extending in the front-rear direction, and includes a side sill inner panel 51 on the side of the vehicle compartment 2 and a side sill outer panel 52 on the vehicle outer side. Further, a jack-up stiffener 53 extending in the front-rear direction is provided between the side sill inner panel 51 and the side sill outer panel 52 at the front end of the side sill 50. As shown in FIG. 8, the front pillar lower 4 is also joined to the dash flange 18 provided on the end in the vehicle width direction of the dash lower panel 10. The side sill 50 connects a lower end of the front pillar lower 4 and a lower end of a center pillar (not shown).

As shown in FIG. 8, the side sill inner panel 51 is basically formed in a groove shape (hat shape) opening to the vehicle outer side in a cross-sectional view. A front end 51a of the side sill inner panel 51 overlaps the lateral flange 22d of the first lateral closed cross-sectional portion 22 from the side of the vehicle compartment 2. The front end 51a of the side sill inner panel 51, the lateral flange 22d and the dash flange 18 are joined together (three joined) by spot welding. Then, the front end 51a of the side sill inner panel 51 is disposed behind the vertical wall 22a of the first lateral closed cross-sectional portion 22 (see FIGS. 4, 6). Therefore, when the side sill inner panel 51 and the lateral flange 22d are disconnected from each other at the time of front collision, the vertical wall 22a of the first lateral closed cross-sectional portion 22 is brought into contact with the front end 51a of the side sill inner panel 51. The shape and structure of the side sill inner panel 51 is not particularly limited and, for example, the side sill inner panel 51 may be divided into upper and lower members, so that the upper and lower members vertically sandwich the floor plate 13 and the floor panel.

The jack-up stiffener 53 is a member for reinforcing the side sill 50 and supporting a load during jack-up. An upper end and a lower end of the jack-up stiffener 53 are sandwiched by the side sill inner panel 51 and the side sill outer panel 52. The jack-up stiffener 53 is provided with a stiffener flange 53a formed to be bent outwardly in the vehicle width direction at a front end thereof.

As shown in FIGS. 3, 5, an outrigger 60 extending in the vehicle width direction is joined to the dash lower panel 10 on a side of the power source device chamber 3. The outrigger 60 extends in the vehicle width direction on an opposite side of the first lateral closed cross-sectional portion 22 with the dash lower panel 10 interposed therebetween. That is, the outrigger 60 covers the ridge line 16 under the wheel arch-shaped portion 14 from the side of the power source device chamber 3. The outrigger 60 forms a plurality of closed cross-sections extending in the vehicle width direction along with the dash lower panel 10. An outer end 60a (see FIG. 6) in the vehicle width direction of the outrigger 60 extends beyond the outer end (dash flange 18) in the vehicle width direction of the dash lower panel 10, and is joined to the stiffener flange 53a of the jack-up stiffener 53. An inner end in the vehicle width direction of the outrigger 60 is joined to a bottom surface of a bent portion 71 of a front side frame 70 described below.

As shown in FIG. 5, the outrigger 60 is formed in a substantially L shape in a vertical cross-sectional view, and has an outrigger vertical wall 61 extending vertically and an outrigger bottom wall 62 extending rearwardly from a lower end of the outrigger vertical wall 61. An upper end 61a of the outrigger vertical wall 61 is disposed between the first lateral closed cross-sectional portion 22 and the second lateral closed cross-sectional portion 23, and is joined (three joined) to the reinforcing panel 20 via the wheel arch-shaped portion 14 (see * in FIG. 5). A vertically middle portion 61b of the outrigger vertical wall 61 is joined (three joined) to the recessed portion 22c of the first lateral closed cross-sectional portion 22 via the wheel arch-shaped portion 14 below the first lateral closed cross-sectional portion 22 (in the vicinity of the ridge line 16 under the wheel arch-shaped portion 14). A portion between the upper end 61a and the middle portion 61b of the outrigger vertical wall 61 is separated from a front surface of the wheel arch-shaped portion 14. Thus, in front of the first lateral closed cross-sectional portion 22 (on an opposite side of the first lateral closed cross-sectional portion 22 with the dash lower panel 10 interposed therebetween), an outrigger first closed cross-section C4 extending in the vehicle width direction is formed by the wheel arch-shaped portion 14 and the outrigger vertical wall 61. That is, the first lateral closed cross-section C1 and the outrigger first closed cross-section C4 forms a closed cross-section having a large cross-sectional area.

The lower end of the outrigger vertical wall 61 is disposed below the ridge line 16 under the wheel arch-shaped portion 14. The outrigger bottom wall 62 is disposed below the inclined portion 12. An outrigger lower flange 62a having a substantially inverted L shape in a cross-sectional view is formed at a rear end of the outrigger bottom wall 62. The outrigger lower flange 62a is joined to a portion near a boundary between the inclined portion 12 and the floor plate 13. Thus, an outrigger second closed cross-section C5 is formed by the dash lower panel 10 and the outrigger bottom wall 62. As a result, by a hollow structure forming the outrigger first closed cross-section C4 and the outrigger second closed cross-section C5, the side sill 50 and the front side frame 70 described below are connected to each other.

Figure 9:
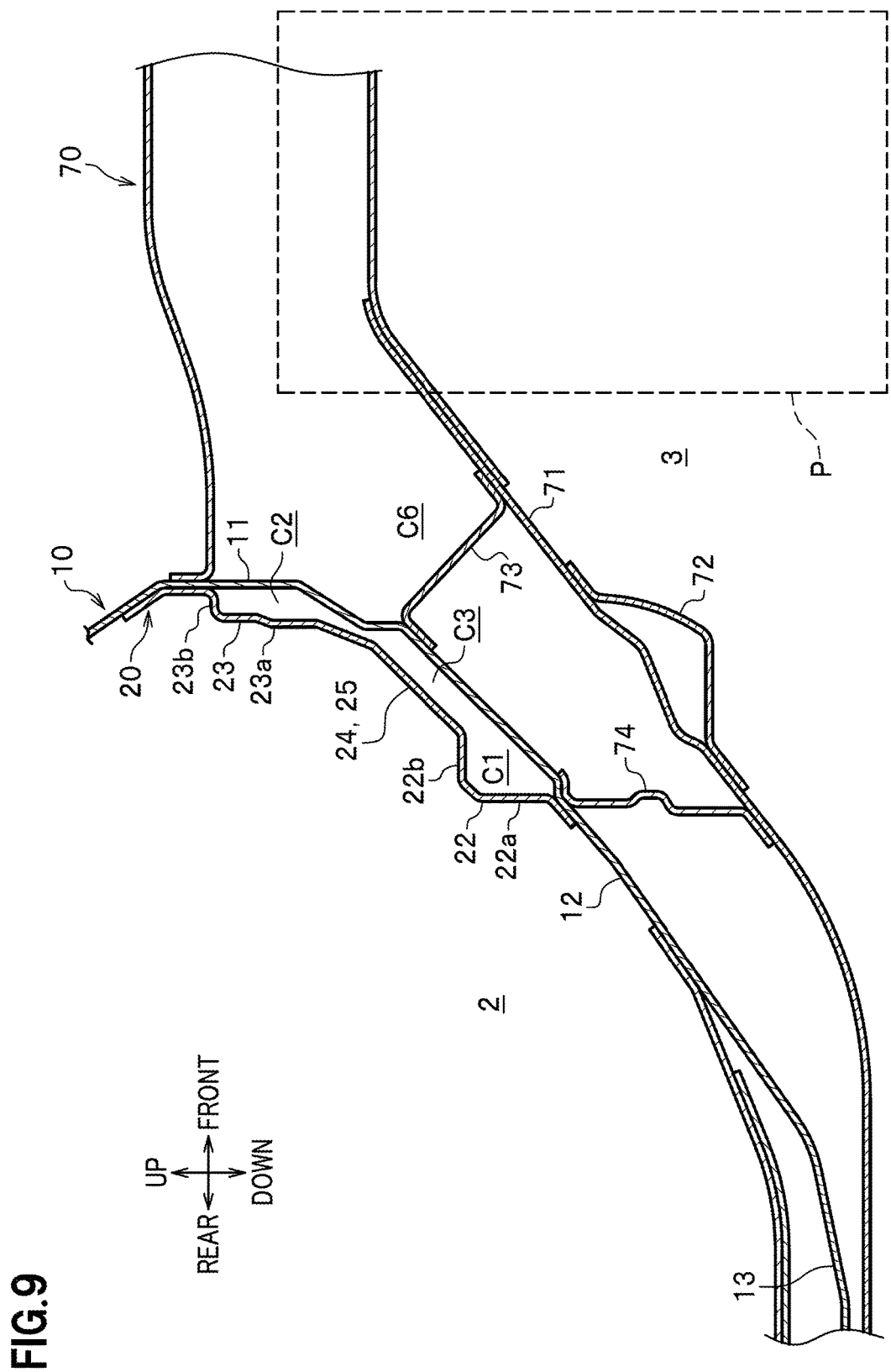
FIG. 9 is a vertical cross-sectional view taken along a line IX-IX of FIG. 2.

As shown in FIGS. 3, 9, a pair of front side frames 70 extending in the front-rear direction is joined to the dash lower panel 10 on the side of the power source device chamber 3. The pair of front side frames 70 is a hollow frame member formed in a substantially rectangular tubular shape, and supports a power source device P such as an engine disposed between the front side frames 70. Front ends of the front side frames 70 are respectively joined to left and right ends of a bumper beam (not shown). Rear ends of the front side frames 70 are joined to the front plate 11 and the inclined portion 12 of the dash lower panel 10 from the side of the power source device chamber 3. In more details, the front side frame 70 has the rear end provided with a bent portion 71 bending downwardly along the front plate 11 and the inclined portion 12. The bent portion 71 is formed in a groove shape (hat shape) opening rearwardly (or upwardly) in a cross-sectional view. The bent portion 71 is joined to the dash lower panel 10, to form a front closed cross-section C6 extending in the front-rear direction along with the front plate 11 and the inclined portion 12. The innermost vertical closed cross-sectional portion 25 of the reinforcing panel 20 is disposed on an opposite side of the bent portion 71 (in more details, an upper half of the bent portion 71) with the dash lower panel 10 interposed therebetween.

An attachment portion 72 for attaching a mount portion (not shown) of the power source device P is joined to a lower surface of the bent portion 71. A pair of stiffeners 73, 74 is provided inside the bent portion 71 and in front of and behind the attachment portion 72. The stiffeners 73, 74 are reinforcing plate members, and divide the front closed cross-section C6 into front and rear portions. Upper ends and lower ends of the stiffeners 73, 74 are respectively joined to the dash lower panel 10 and the bent portion 71.

As shown in FIGS. 4, 6, the upper wall 22b of the first lateral closed cross-sectional portion 22 has the maximum width dimension W in the front-rear direction at a portion corresponding to the ridge line 16 which is the boundary between the wheel arch-shaped portion 14 and the inclined portion 12 that is the general portion 15. In more details, a rear end (the vertical wall 22a) of the upper wall 22b extends substantially linearly to be located rearwardly toward an outer side in the vehicle width direction. On the other hand, a front end of the upper wall 22b is formed along a rear surface shape of the inclined portion 12 and the wheel arch-shaped portion 14. The inclined portion 12 facing the front end of the upper wall 22b extends in a direction (the left-right direction) substantially perpendicular to the front-rear direction. The wheel arch-shaped portion 14 facing the front end of the upper wall 22b bulges in an arc shape to the vehicle compartment 2 to be located rearwardly toward the outer side in the vehicle width direction. Therefore, in the ridge line 16 which is the boundary between the inclined portion 12 and the wheel arch-shaped portion 14, a distance between the vertical wall 22a and the dash cross member 80 is the largest, so that a dimension in the front-rear direction of the upper wall 22b increases.

Next, structures of the tunnel member 30 and the dash cross member 80 will be described in detail mainly with reference to FIGS. 10 to 15.

As shown in FIGS. 10 to 14 (mainly FIG. 11), the front tunnel member 31 is, for example, a member formed by bending a general steel plate having a lower strength than that of the high-tensile steel plate into a groove shape opening downwardly by press molding. The front tunnel member 31 includes a front tunnel upper wall 31a constituting an upper wall, a front tunnel left wall 31b and a front tunnel right wall 31c respectively extending downwardly from left and right ends of the front tunnel upper wall 31a and constituting side walls, and a front tunnel flange 31d which is bent and formed at a front end and a lower end of the upper wall and the side walls. The front tunnel upper wall 31a is inclined to be located higher toward the front. The front tunnel upper wall 31a has a bead-shaped portion 31e extending in the vehicle width direction at a central portion thereof in the front-rear direction. The bead-shaped portion 31e has a convex surface on the side of the vehicle compartment 2 and a concave surface on the opposite side of the vehicle compartment 2 (see FIG. 14). In the present embodiment, the front tunnel left wall 31b and the front tunnel right wall 31c are formed flat. The front tunnel flange 31d is joined to an edge of the cutting out portion 17. A tunnel left ridge line 31f which is a left ridge line is extended in the front-rear direction by a bent portion in which the front tunnel upper wall 31a and the front tunnel left wall 31b are continuous to each other. A tunnel right ridge line 31g which is a right ridge line is extended in the front-rear direction by a bent portion in which the front tunnel upper wall 31a and the front tunnel right wall 31c are continuous to each other.

The rear tunnel member 32 is a member constituting a main body of the tunnel member 30. The rear tunnel member 32 is, for example, a member formed by bending the high tensile steel plate into a groove shape opening downwardly by hot-stamp molding, and extends substantially horizontally. Inner ends in the vehicle width direction of the floor panels are respectively joined to left and right lower ends of the rear tunnel member 32. Here, hot-stamp molding is also called hot press molding, and is a molding method in which a steel plate is pressed while being heated and softened, to be simultaneously quenched by a cooling effect by contact with a mold. Spring back of the steel plate is suppressed by heat softening, so that dimensional accuracy is improved, and strength of the member is increased by quenching.

Figure 12:
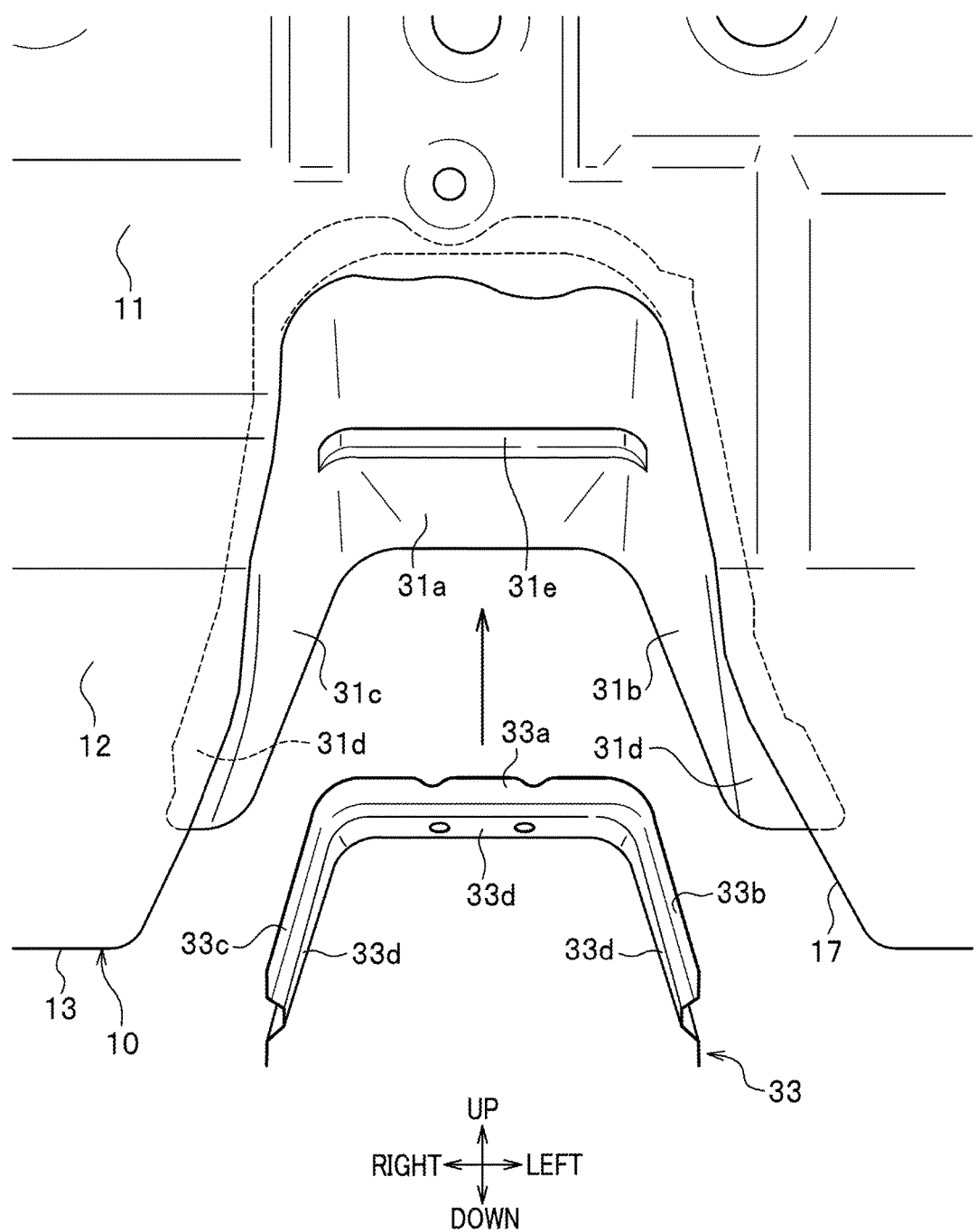
FIG. 12 is a front view of the front tunnel member viewed from front with a tunnel closed cross-section forming member separated.
Figure 13:
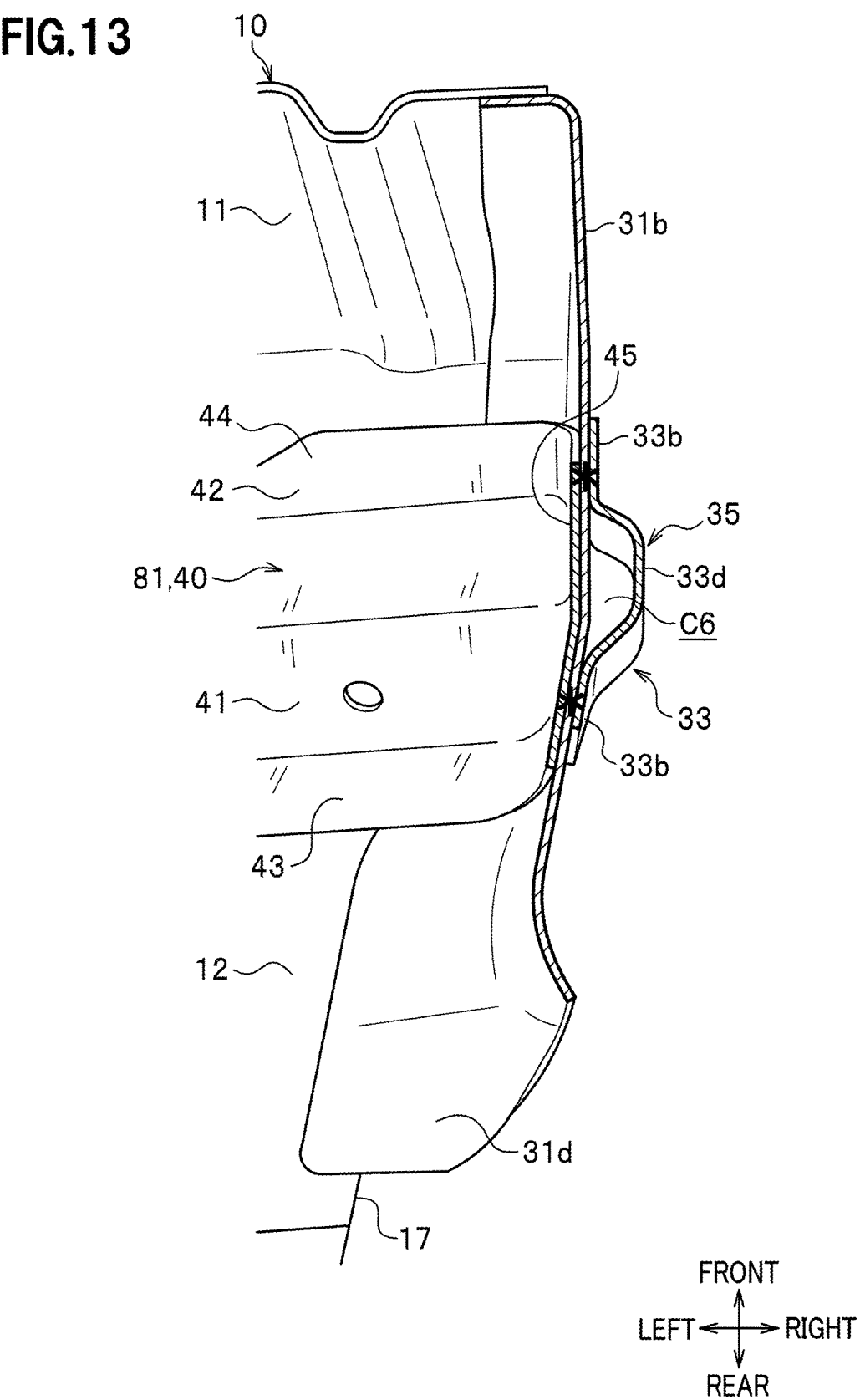
FIG. 13 is a substantially horizontal cross-sectional view taken along a line XIII-XIII of FIG. 11.
Figure 14:
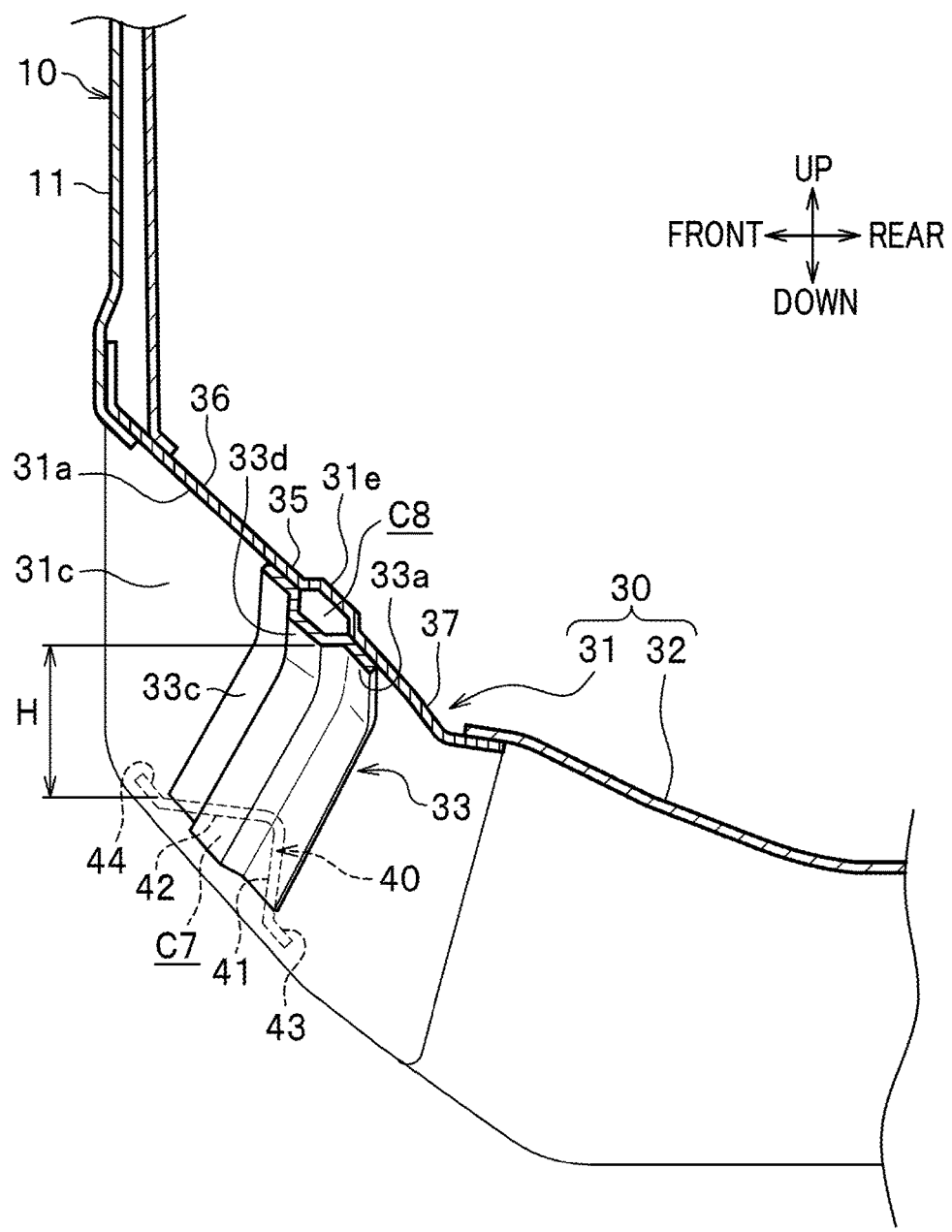
FIG. 14 is a vertical cross-sectional view taken along a line XIV-XIV of FIG. 10.

As shown in FIGS. 12 to 14, the tunnel closed cross-section forming member 33 is a belt-shaped member having a smaller width in the front-rear direction than that of the front tunnel member 31. The tunnel closed cross-section forming member 33 is, for example, formed by bending an elongated belt-shaped high tensile steel plate into an inverted U shape by press molding. The tunnel closed cross-section forming member 33 has an upper belt 33a joined to a rear surface of the front tunnel upper wall 31a, a left belt 33b joined to a rear surface of the front tunnel left wall 31b, a right belt 33c joined to a rear surface of the front tunnel right wall 31c, and a bead-shaped portion 33d having a concave surface on a side of the front tunnel member 31 and having a convex surface on an opposite side of the front tunnel member 31. The tunnel closed cross-section forming member 33 is joined to a central portion in the front-rear direction of the front tunnel member 31.

The bead-shaped portion 33d is formed continuously over an entire length in a longitudinal direction at a central portion in a short-side direction of the tunnel closed cross-section forming member 33. When the closed cross-section forming member 33 is joined to the front tunnel member 31, the bead-shaped portion 33d is separated from a rear surface of the front tunnel member 31, to form a closed cross-section C8. Thus, at the central portion in the front-rear direction of the front tunnel member 31, a tunnel closed cross-sectional portion 35 is formed continuously in the vehicle width direction from the front tunnel left wall 31b through the front tunnel upper wall 31a to the front tunnel right wall 31c. The tunnel closed cross-sectional portion 35 constitutes a part of the central portion of the dash cross member 80 described below.

In the front tunnel member 31, a front fragile portion 36 and a rear fragile portion 37 are respectively formed in front and rear regions of a portion (the tunnel closed cross-sectional portion 35) to which the tunnel closed cross-section forming member 33 is joined. Since the front fragile portion 36 and the rear fragile portion 37 are, for example, formed of a single general steel plate, they have a lower compressive strength than that of the rear tunnel member 32 as a tunnel main body formed of the high tensile steel plate against a load from front. Since the front fragile portion 36 and the rear fragile portion 37 are not reinforced by the tunnel closed cross-section forming member 33, they have a lower compressive strength than that of the tunnel closed cross-sectional portion 35.

As shown in FIG. 13, a lower end of the left belt 33b is joined (three joined) to the lateral member end flange 45 on the left side via the front tunnel left wall 31b on the front and rear sides of the bead-shaped portion 33d. Similarly, although not shown, a lower end of the right belt 33c is also joined (three joined) to the lateral member end flange 45 on the right side via the front tunnel right wall 31c on the front and rear sides of the bead-shaped portion 33d. In other word, the lateral members 40 provided on the left and right sides of the front tunnel member 31 are connected to each other by the tunnel closed cross-section forming member 33.

As shown in FIG. 14, the upper belt 33a is joined along the bead-shaped portion 31e of the front tunnel upper wall 31a. Thus, the bead-shaped portion 33d of the upper belt 33a is disposed to face the bead-shaped portion 31e of the front tunnel upper wall 31a. Therefore, in the tunnel closed cross-sectional portion 35, a cross-sectional area of a portion corresponding to the front tunnel upper wall 31a increases, so that rigidity and strength of the portion are increased.

As shown in FIG. 14, the tunnel closed cross-section forming member 33 is joined to the rear surface of the front tunnel member 31. Meanwhile, the lateral member 40 as a part of a panel closed cross-section forming member 83 described below is joined to a surface on the side of the vehicle compartment 2 of the dash lower panel 10. Therefore, a vertical offset amount H between the closed cross-section C7 and the closed cross-section C8 is smaller than that when the tunnel closed cross-section forming member 33 is joined to a surface on the side of the vehicle compartment 2 of the front tunnel member 31.

Figure 10:
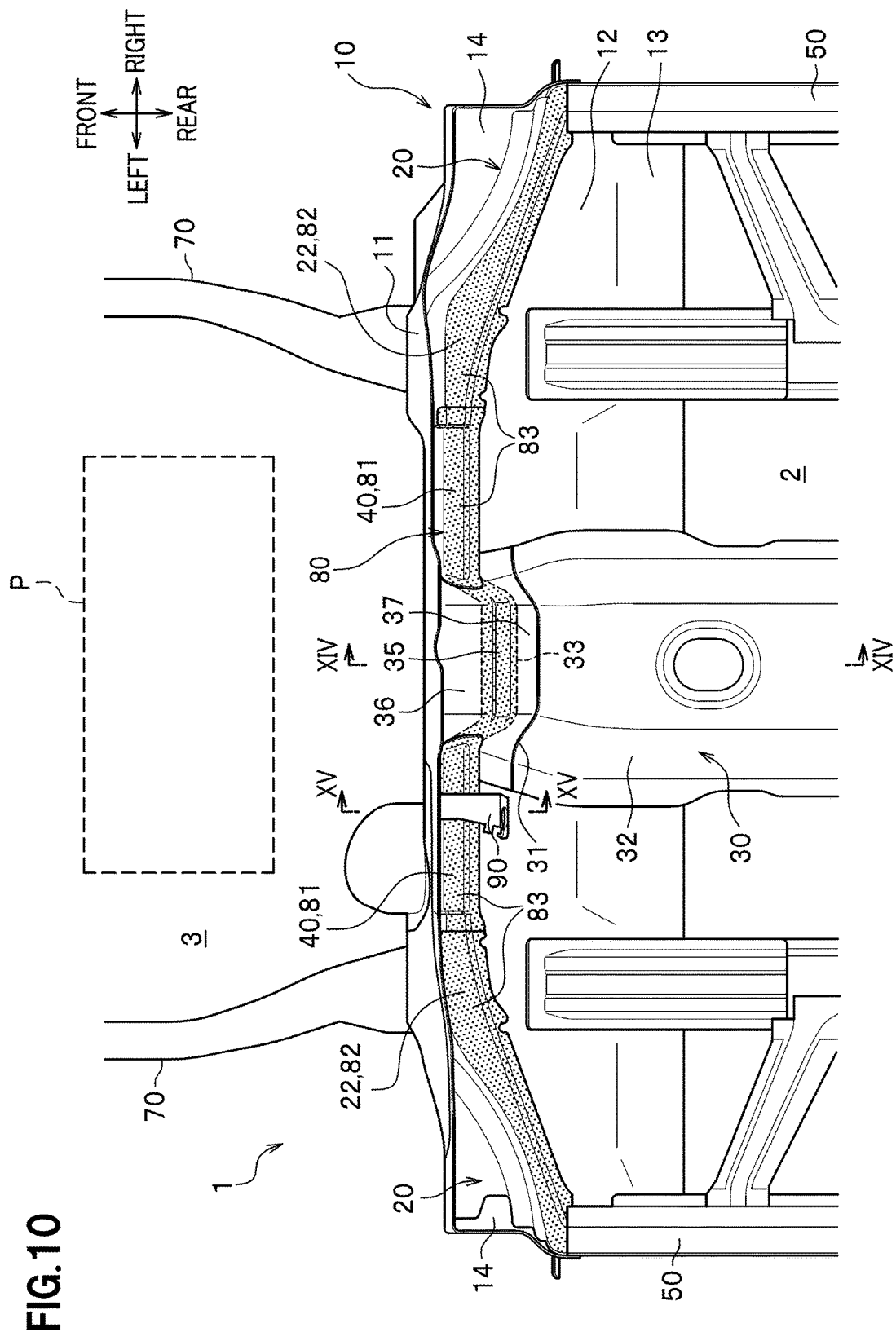
FIG. 10 is a plan view of the vehicle body structure viewed from above.
Figure 11:
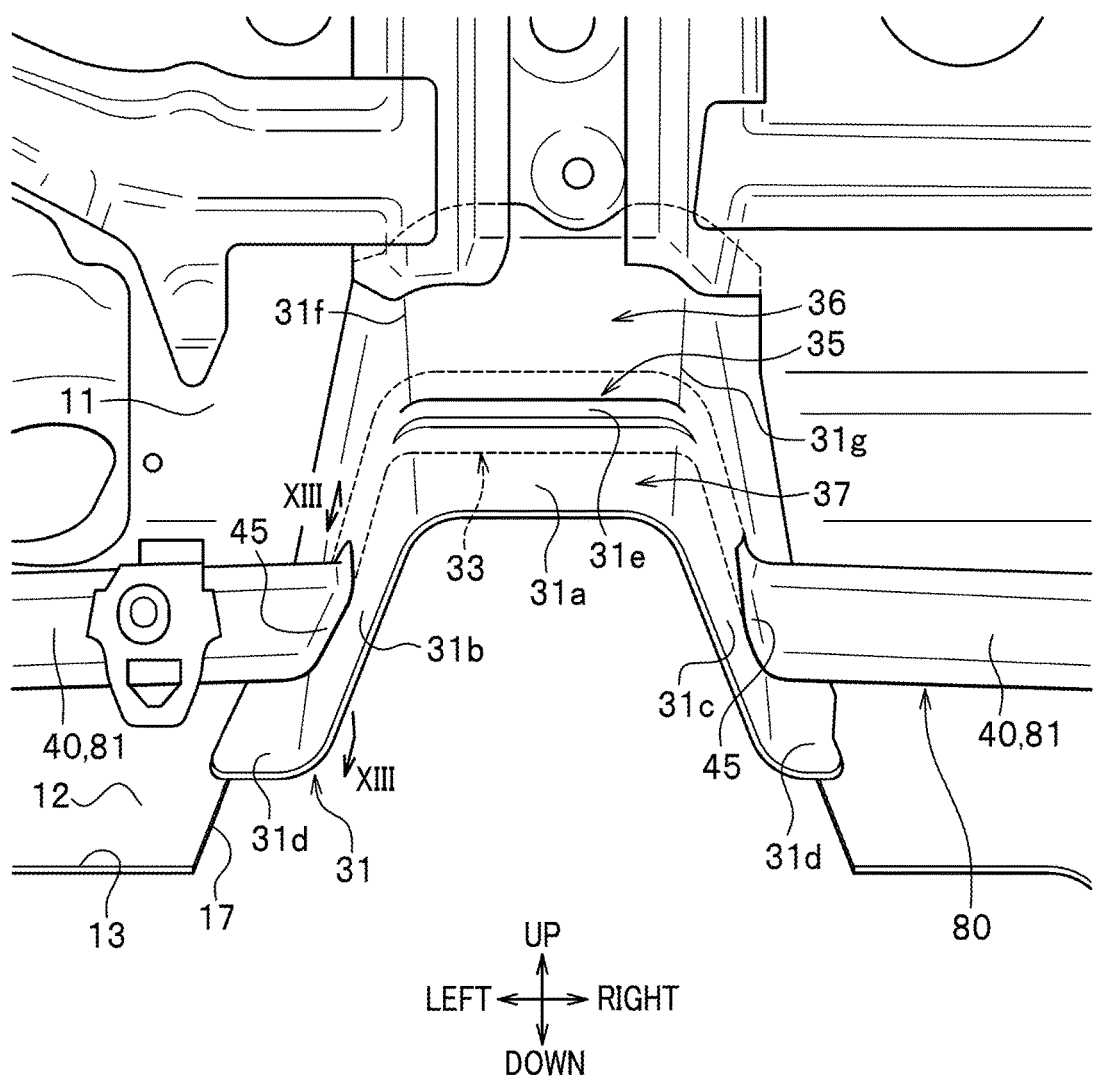
FIG. 11 is a rear view of a front tunnel member viewed from the rear.

As shown in FIG. 10, the dash cross member 80 is a frame member provided in the dash lower panel 10 and constituting a closed cross-section extending in the vehicle width direction. The dash cross member 80 has a convex shape with a central portion located forward of both ends in the vehicle width direction in plan view. The dash cross member 80 includes the panel closed cross-section forming member 83 to form a closed cross-section along with the dash lower panel 10 and the tunnel closed cross-section forming member 33 to form a closed cross-section along with the front tunnel member 31.

The panel closed cross-section forming member 83 is a member joined to the surface on the side of the vehicle compartment 2 of the dash lower panel 10 on both sides of the tunnel member 30. The panel closed cross-section forming member 83 includes the lateral members 40 as a pair of vehicle width direction members 81 disposed on both sides in the vehicle width direction of the tunnel member 30, and the first lateral closed cross-sectional portions 22 as a pair of rear inclined members 82 respectively connected to outer ends of the vehicle width direction members 81 and located rearwardly toward the outer side in the vehicle width direction. The lateral members 40 as the vehicle width direction members 81 are connected to the tunnel closed cross-section forming member 33 via the front tunnel member 31. The first lateral closed cross-sectional portion 22 as the rear inclined member 82 is formed integrally with the reinforcing panel 20.

Figure 15:
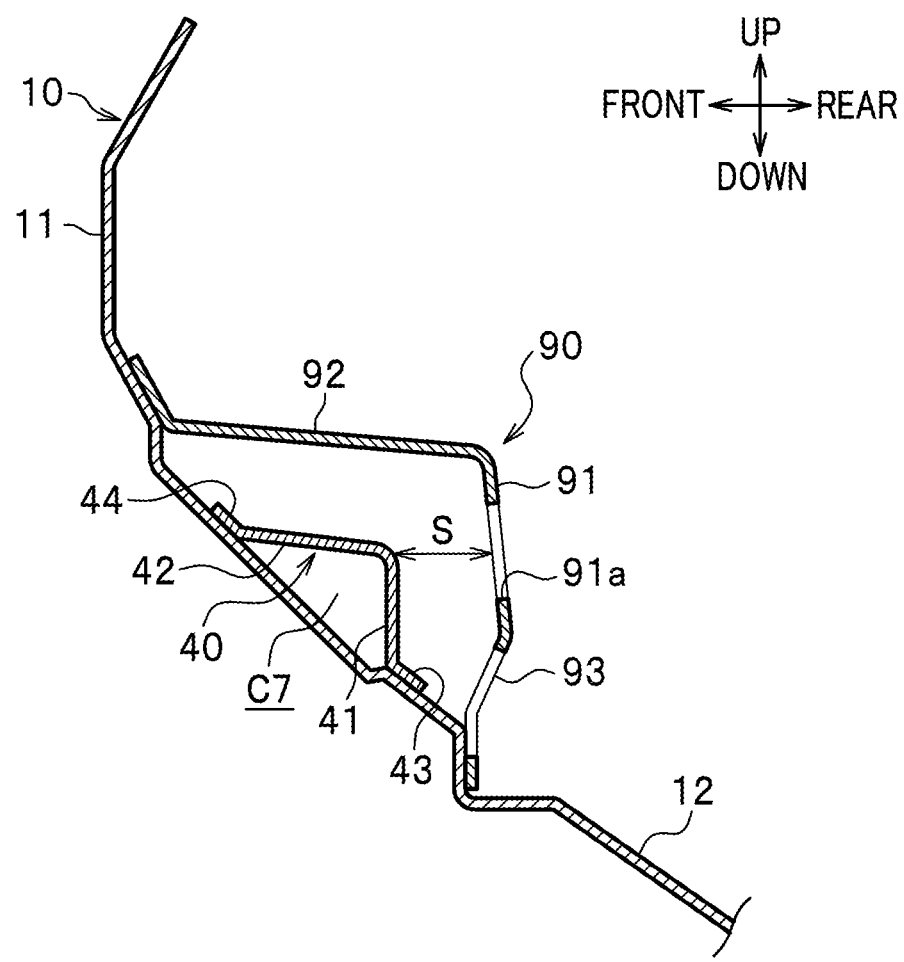
FIG. 15 is a vertical cross-sectional view taken along a line XV-XV of FIG. 10.

As shown in FIG. 15, the closed cross-section C7 formed by the dash lower panel 10 and the lateral member 40 as the vehicle width direction member 81 has a smaller cross-sectional area than that of the closed cross-section C1 formed by the dash lower panel 10 and the first lateral closed cross-sectional portion 22 as the rear inclined member 82 (see FIGS. 5, 6). The first lateral closed cross-sectional portion 22 as the rear inclined member 82 is disposed as a brace obliquely with respect to the lateral member 40 as the vehicle width direction member 81. Therefore, the vehicle width direction member 81 has a lower bending strength than that of the rear inclined member 82 against the load from the front.

As shown in FIG. 15, a pedal bracket 90 for supporting an accelerator pedal and the like (not shown) of the automobile V is provided in the left inclined portion 12 of the dash lower panel 10. The pedal bracket 90 is provided vertically across the lateral member 40 as the vehicle width direction member 81. In particular, the pedal bracket 90 has a bracket body 91 disposed behind the lateral member 40 with a clearance S, an upper leg 92 extending forwardly from an upper end of the bracket body 91 and joined to the inclined portion 12 above and in front of the lateral member 40, and a lower leg 93 extending downwardly from a lower end of the bracket body 91 and joined to the inclined portion 12 below and behind the lateral member 40. A through-hole 91a for mounting the accelerator pedal and the like is formed in the bracket body 91.

Next, operation of the vehicle body structure 1 according to the present embodiment at the time of front collision will be described with reference to FIGS. 16A, 16B, 17 (appropriately FIGS. 1 to 15).

Figure 16A:
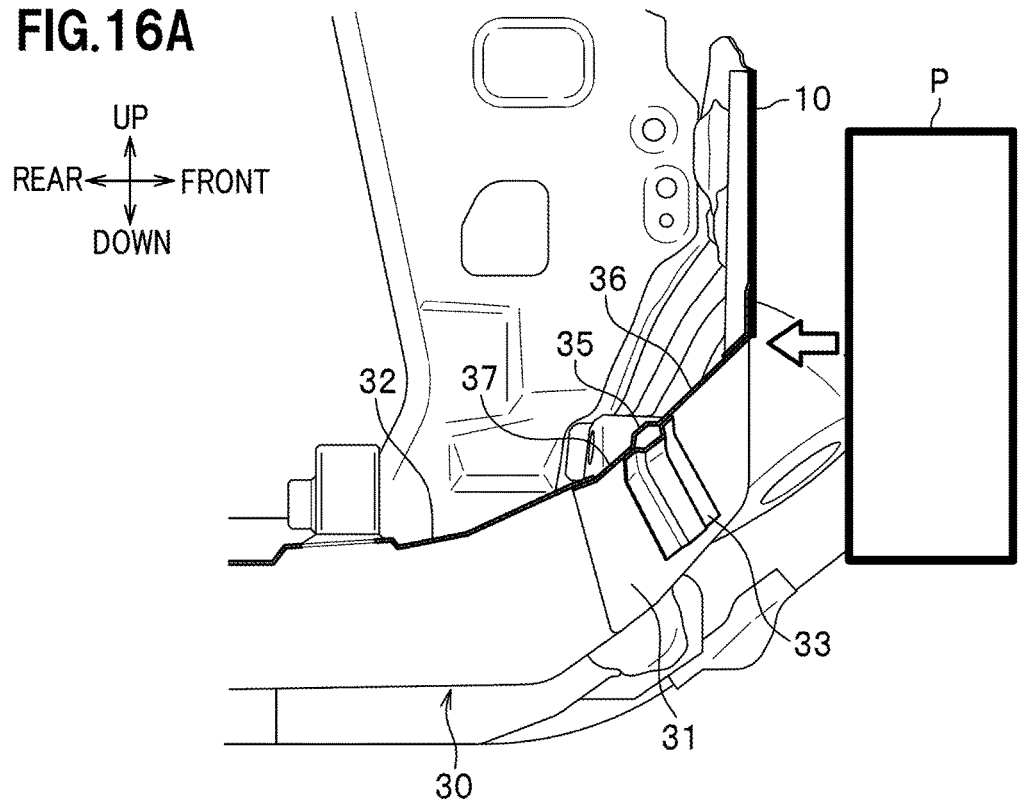
FIG. 16A is a cross-sectional view showing a state of the vehicle body structure before front collision.

As shown in FIG. 16A, the power source device P such as the engine is disposed at a position spaced forward from the dash lower panel 10 before front collision. When the automobile V is subjected to front collision, the power source device P moves backward. Then, since the dash cross member 80 has a convex shape with the central portion located forward of the both ends in the vehicle width direction in plan view, the power source device P moved backward is brought into contact with a portion around the front end of the tunnel member 30 and a portion around the central portion of the dash cross member 80 via the dash lower panel 10.

Figure 16B:
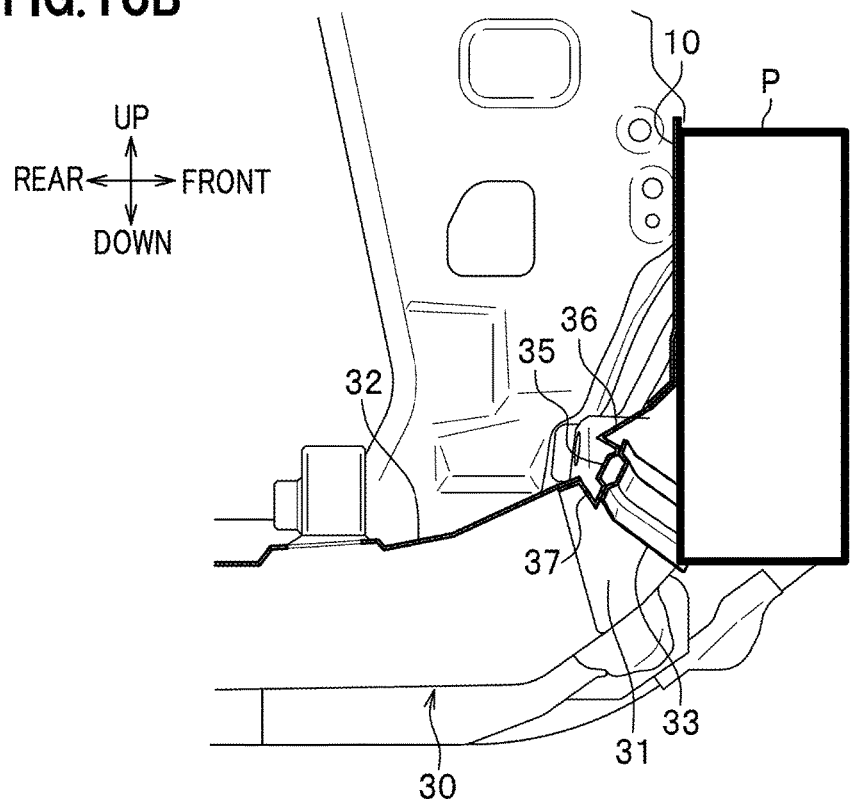
FIG. 16B is a cross-sectional view showing a deformed state of the vehicle body structure after front collision.

As shown in FIG. 16B, when a collision load is applied to the front end of the tunnel member 30 by the power source device P moving backward, the front fragile portion 36 and the rear fragile portion 37 of the front tunnel member 31 having a lower compressive strength than that of the rear tunnel member 32 constituting the tunnel main body are compressively deformed, so that collision energy is absorbed. Then, since the tunnel closed cross-sectional portion 35 has a higher compressive strength than that of the front and rear fragile portions 36, 37, and a portion around a lower end thereof is supported by the left and right lateral members 40, the tunnel closed cross-sectional portion 35 is deformed to be inclined rearwardly while maintaining shape of the closed cross section.

Since the front tunnel member 31 is inclined to be located higher toward the front, the front fragile portion 36 and the rear fragile portion 37 are easily deformed (bent) as compared with a case where the front tunnel member 31 is placed horizontally. For example, FIG. 16B shows a case where the front fragile portion 36 is bent to rise over the tunnel closed cross-sectional portion 35, and the rear fragile portion 37 is bent to sink under the rear tunnel member 32.

Figure 17:
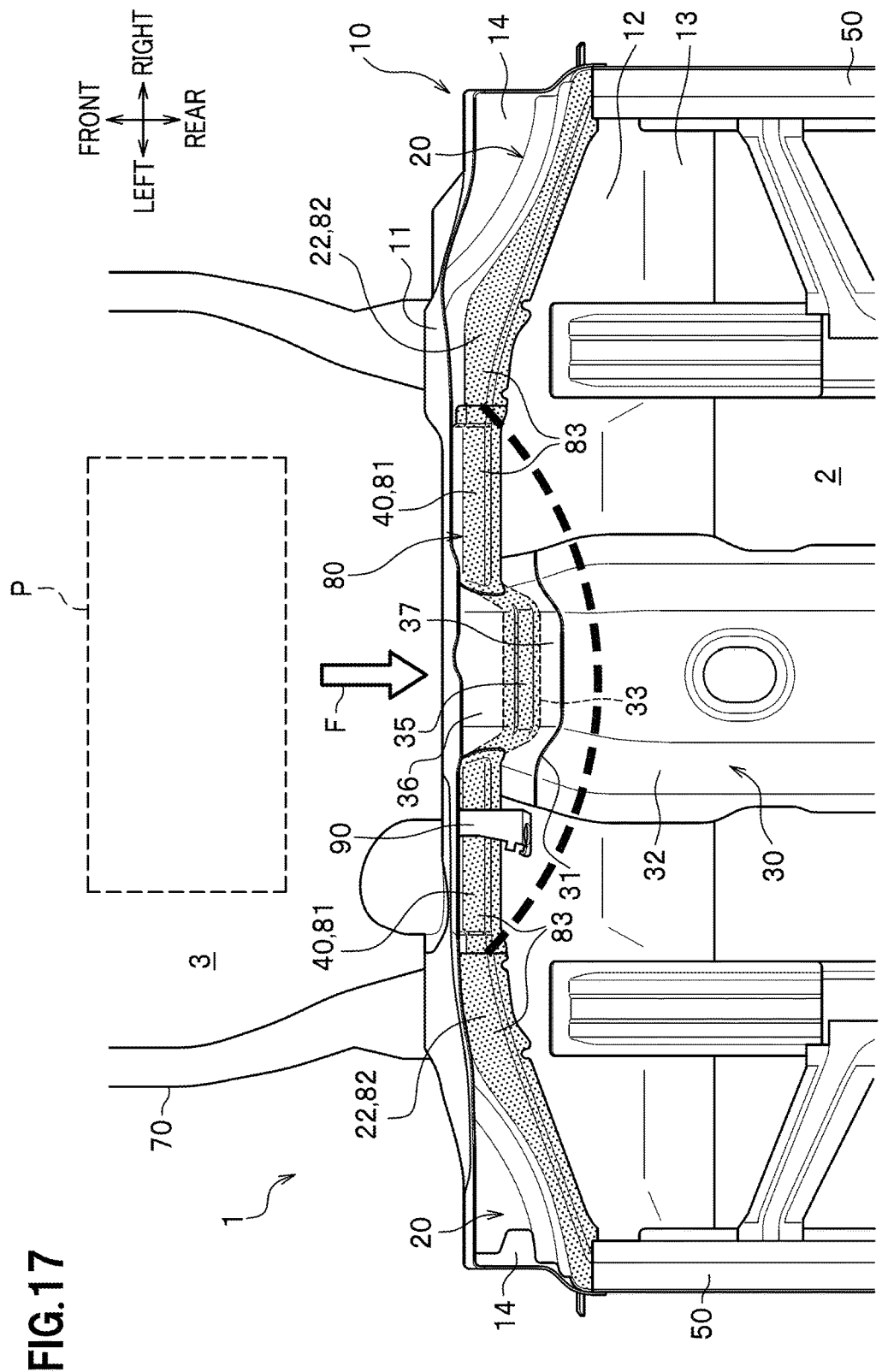
FIG. 17 is a plan view showing a deformed state of the vehicle body structure at the time of front collision.

As shown in FIG. 17, the dash cross member 80 is deformed by the collision load (see thick broken line in FIG. 17), so that the vehicle width direction member 81 (lateral member 40) and the tunnel closed cross-sectional portion 35 are bent rearwardly like a bow (in an arch shape). This is because the vehicle width direction member 81 has a lower bending strength than that of the rear inclined member 82 against the load from the front. Thus, deformation of the front fragile portion 36 and the rear fragile portion 37 is promoted.

The vehicle body structure 1 according to the present embodiment is basically configured as described above, and operational effect of the vehicle body structure 1 will be described below.

With the vehicle body structure 1 according to the present embodiment, since the dash cross member 80 has a convex shape with the central portion located forward of the both ends in the vehicle width direction in plan view, when the power source device P moves rearwardly due to, for example, full flat collision, the central portion of the dash cross member 80 is first pressed by the power source device P. Then, since the front fragile portion 36 provided in front of the tunnel closed cross-sectional portion 35 constituting a part of the central portion of the dash cross member 80 has a lower compressive strength than that of the rear tunnel member 32 as the tunnel body member disposed behind the tunnel closed cross-sectional portion 35 against the collision from the front, when the power source device P moves rearwardly, the front fragile portion 36 is crushed before the rear tunnel member 32, so that the collision energy can be absorbed. Therefore, deceleration applied to an occupant can be reduced.

As shown in FIG. 14, since the lateral member 40 as the panel closed cross-section forming member 83 is joined to the surface on the side of the vehicle compartment 2 of the dash lower panel 10, and the tunnel closed cross-section forming member 33 is joined to the surface opposite to the vehicle compartment 2 side of the front tunnel member 31, the vertical offset amount H between the closed cross-section C7 formed by the lateral member 40 and the closed cross-section C8 formed by the tunnel closed cross-section forming member 33 is reduced. Therefore, bending strength of the dash lower member 80 can be increased.

As shown in FIG. 16, since the front tunnel member 31 has the rear fragile portion 37 having a lower compressive strength than that of the rear tunnel member 32 against the load from the front, between the rear tunnel member 32 and the tunnel closed cross-sectional portion 35, an amount of collision energy absorption is increased along with the front fragile portion 36. Therefore, deceleration applied to the occupant can be further reduced.

As shown in FIGS. 10, 17, the lateral members 40 which is the pair of vehicle width direction members 81 are connected by the tunnel closed cross-section forming member 33, and the outer ends of the lateral members 40 are supported by the first lateral closed cross-sectional portion 22 as the pair of rear inclined members 82 acting as a brace. Therefore, when the power source device P moves rearwardly by front collision, the central portion of the dash cross member 80 formed by the pair of lateral members 40 and the tunnel closed cross-section forming member 33 is easily bent rearwardly in an arch shape, so that deformation of the front fragile portion 36 and the rear fragile portion 37 is promoted. Therefore, deceleration applied to the occupant can be further reduced.

Since the lateral member 40 as the vehicle width direction member 81 has a lower bending strength than that of the first lateral closed cross-sectional portion 22 as the rear inclined member 82 against the load from the front, the central portion of the dash cross member 80 formed by the pair of lateral members 40 and the tunnel closed cross-section forming member 33 is more easily bent rearwardly in an arch shape.

As shown in FIG. 14, since the tunnel closed cross-sectional portion 35, the front fragile portion 36 and the rear fragile portion 37 are provided in the front tunnel member 31 inclined to be located higher toward the front, compressive deformation (bending deformation) of the front fragile portion 36 and the rear fragile portion 37 is promoted. Since the rear tunnel member 32 constituting the tunnel main body is connected to the rear end of the front tunnel member 31 and extends substantially horizontally, deformation thereof is suppressed. Therefore, promotion of collision energy absorption and suppression of deformation of the vehicle compartment 2 can be both achieved.

As shown in FIG. 15, since the pedal bracket 90 is joined to the dash lower panel 10 vertically across the lateral member 40 as the vehicle width direction member and has the clearance S in the front-rear direction with respect to the lateral member 40, when the dash cross member 80 is bent rearwardly in an arch shape, the lateral member 40 can be suppressed from interfering with the pedal bracket 90.

As shown in FIGS. 4, 10, since the first lateral closed cross-sectional portion 22 as the rear inclined member is formed integrally with the reinforcing panel 20, function of supporting the central portion of the dash cross member 80 as a brace is improved. Therefore, the central portion of the dash cross member 80 is easily bent.

As shown in FIG. 14, since the closed cross-section C8 is formed in the front tunnel member 31 by the bead-shaped portion 31e of the front tunnel upper wall 31a and the bead-shaped portion 33d of the tunnel closed cross-section forming member 33, rigidity of the tunnel closed cross-sectional portion 35 is increased. Therefore, deformation of the front fragile portion 36 and the rear fragile portion 37 can be promoted.

Although the vehicle body structure 1 according to the present embodiment has been described above, the present invention is not limited thereto, and can be changed without departing from the spirit and scope of the present invention.

For example, the first lateral closed cross-sectional portion 22 may be formed separately from the reinforcing panel 20. Further, the first lateral closed cross-sectional portion 22 may be formed integrally with the lateral member 40.

Next, a vertical member 110, upper lateral members 120 and a joint cover 170, which are provided in the front plate 11 of the dash lower panel 10, will be described in detail with reference to FIGS. 18 to 29.

As shown in FIGS. 18 to 21 (mainly FIG. 19), the vertical member 110 is a reinforcing member extending upwardly from the front end of the tunnel member 30 and joined to a surface on the side of the vehicle compartment 2 of the front plate 11. The vertical member 110 includes a left vertical member 111 on the left side and a right vertical member 112 on the right side. The left vertical member 111 and the right vertical member 112 are arranged separately from each other in the vehicle width direction.

Figure 20:
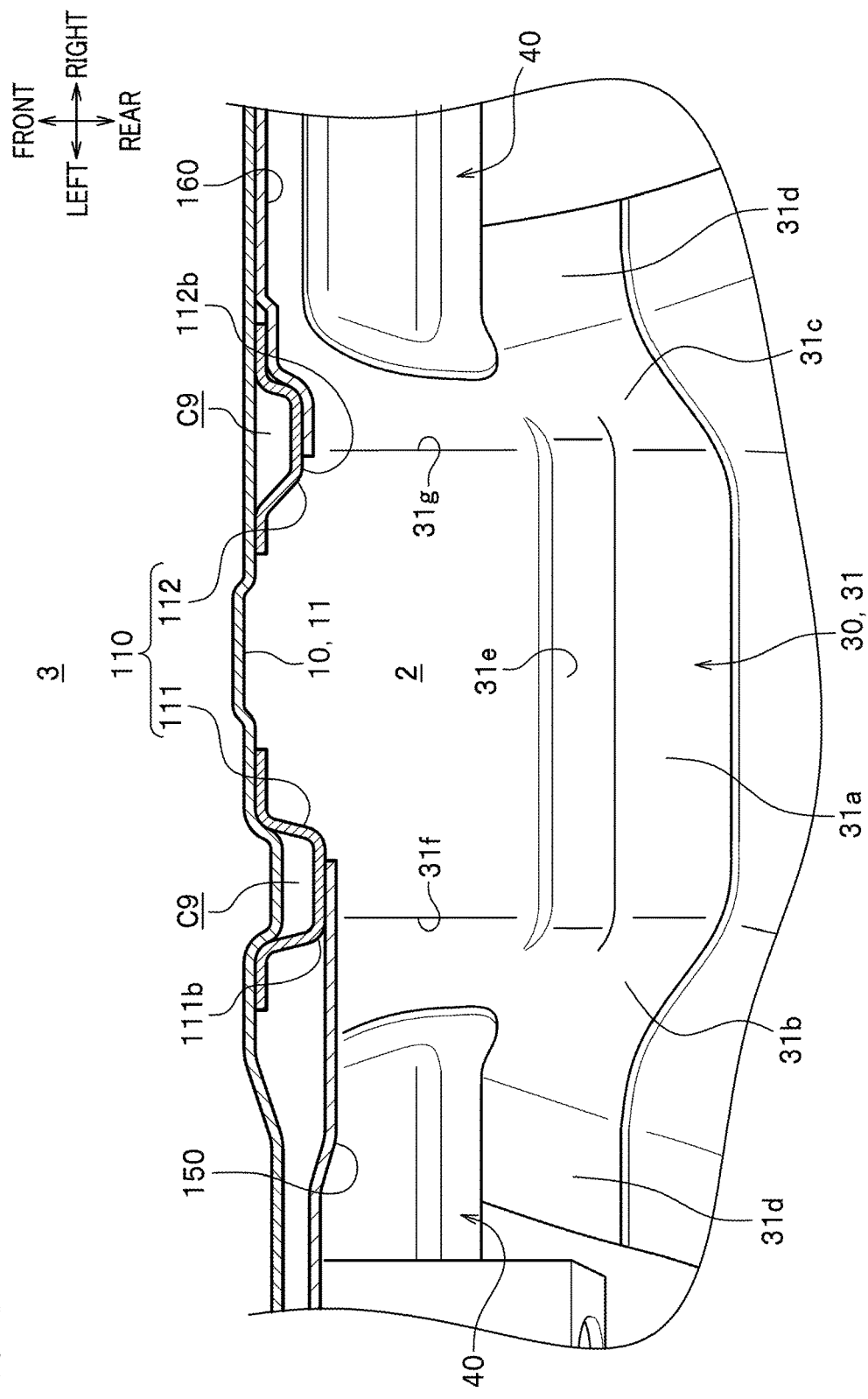
FIG. 20 is a horizontal cross-sectional view taken along a line XX-XX of FIG. 19.

As shown in FIG. 20, the left vertical member 111 and the right vertical member 112 are formed in a substantially hat shape (a groove shape with a flange) in a horizontal cross-sectional view, and central portions thereof in the vehicle width direction bulge toward the vehicle compartment 2. Thus, two independent closed cross-sections C9 are formed between the left vertical member 111 and the front plate 11, and between the right vertical member 112 and the front plate 11.

Figure 19:
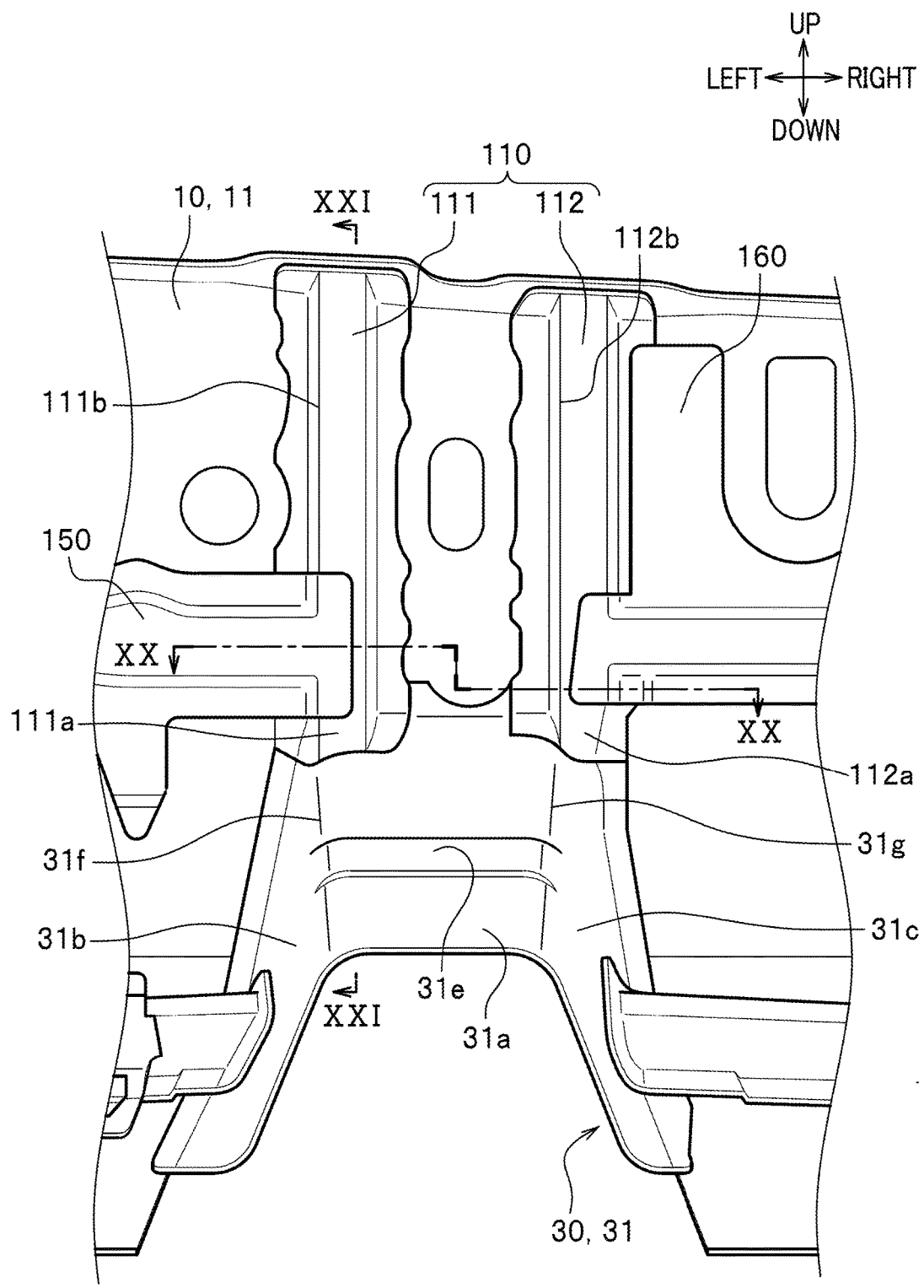
FIG. 19 is a rear view of a central portion of the vehicle body structure viewed from the rear.

As shown in FIG. 19, a lower end 111a of the left vertical member 111 is abutted against and is joined to a portion around the tunnel left ridge line 31f of the front tunnel member 31, and a lower end 112a of the right vertical member 112 is abutted against and joined to a portion around the tunnel right ridge line 31g of the front tunnel member 31. In the present embodiment, a left ridge line 111b of the left vertical member 111 is continuous with the tunnel left ridge line 31f. Further, a left ridge line 112b of the right vertical member 112 is continuous with the tunnel right ridge line 31g. Thus, since the vertical member 110 is continuous with ridge lines of the tunnel member 30 having a high rigidity, rigidity of the dash lower panel 10 is increased.

Figure 21:
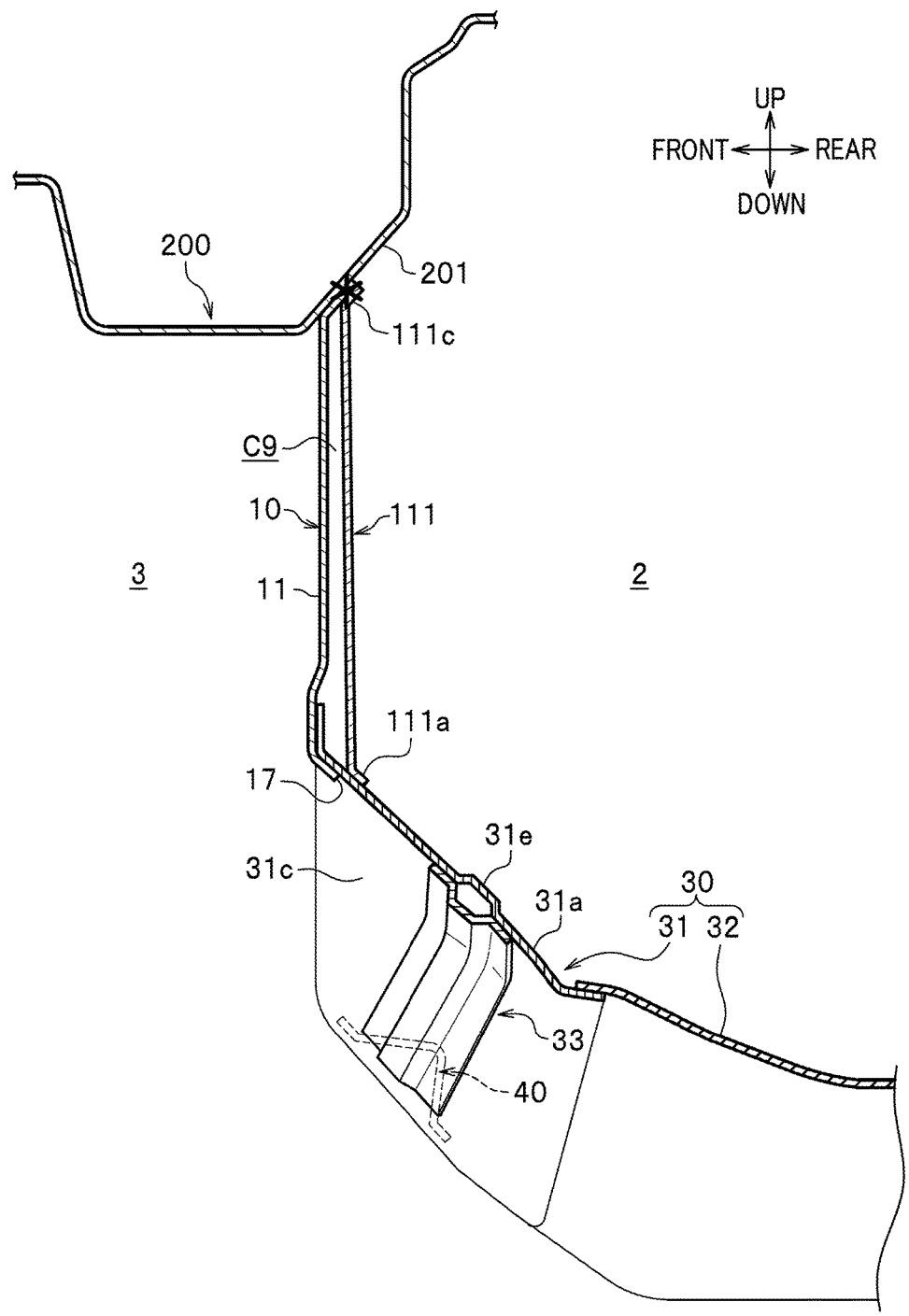
FIG. 21 is a vertical cross-sectional view taken along a line XXI-XXI of FIG. 19.

As shown in FIG. 21, an upper end 111c of the left vertical member 111 is joined to a rear inclined surface 201 of a dash upper panel 200 via the dash lower panel 10. Similarly, although not shown, an upper end of the right vertical member 112 is also joined to the rear inclined surface 201 via the dash lower panel 10. Here, the dash upper panel 200 is a member constituting an upper half of a dashboard, and is formed by bending a high-tensile steel plate into a predetermined shape, for example, by press molding. The dash upper panel 200 is formed in a groove shape opening upwardly in a vertical cross-sectional view in the front-rear direction. The dash upper panel 200 has the rear inclined surface 201 inclined to be located higher toward rear. The rear inclined surface 201 constitutes a part of a groove-shaped rear wall.

Figure 18:
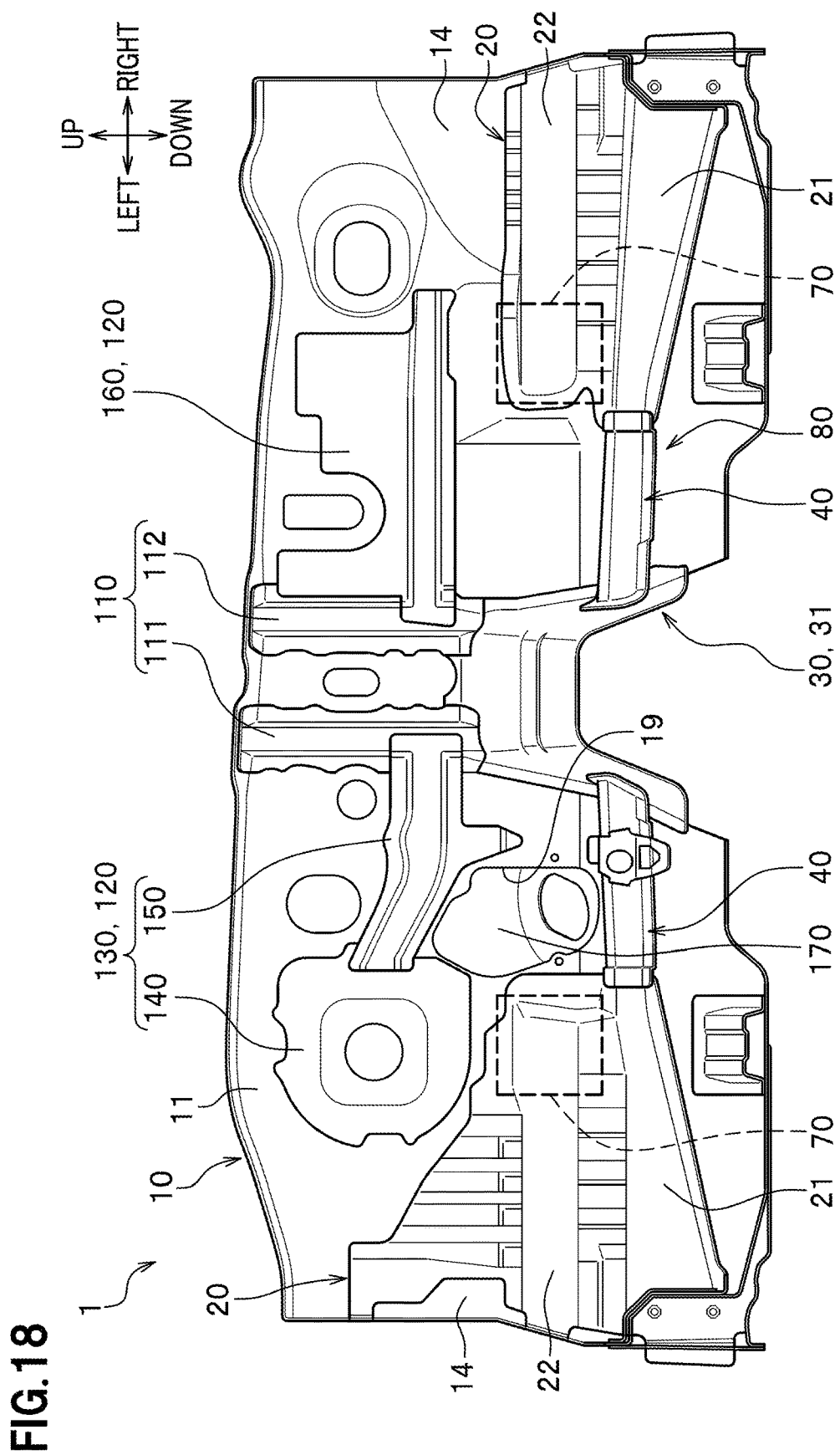
FIG. 18 is a rear view of the vehicle body structure viewed from the rear.

As shown in FIG. 18, the upper lateral members 120 are reinforcing members respectively extending outwardly in the vehicle width direction and joined to the surface on the side of the vehicle compartment 2 of the front plate 11. The upper lateral member 120 includes an upper left lateral member 130 extending leftward in the vehicle width direction from the left vertical member 111 and an upper right lateral member 160 extending rightward in the vehicle width direction from the right vertical member 112.

Figure 22:
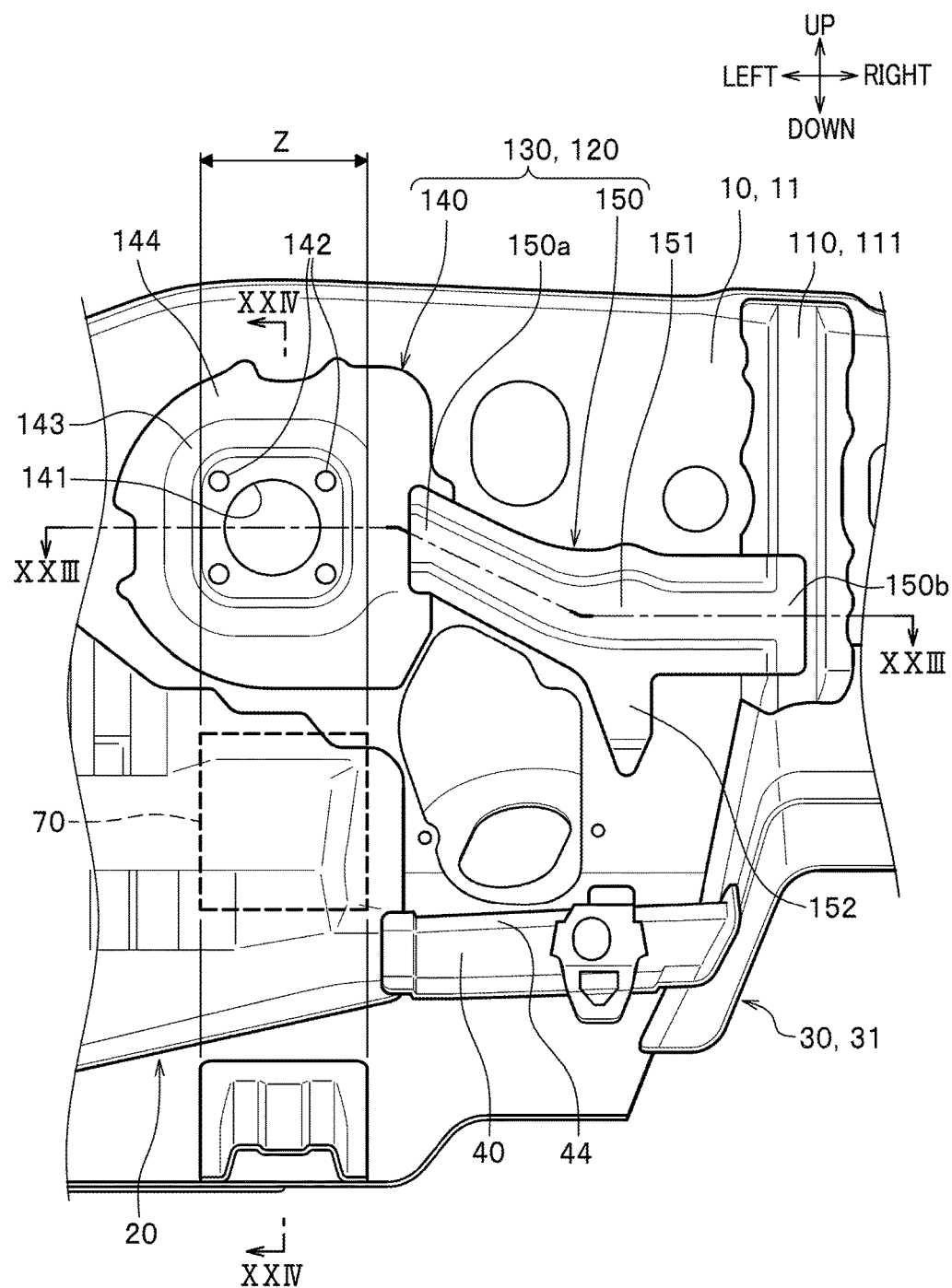
FIG. 22 is a rear view of a left half of the vehicle body structure viewed from the rear.
Figure 23:
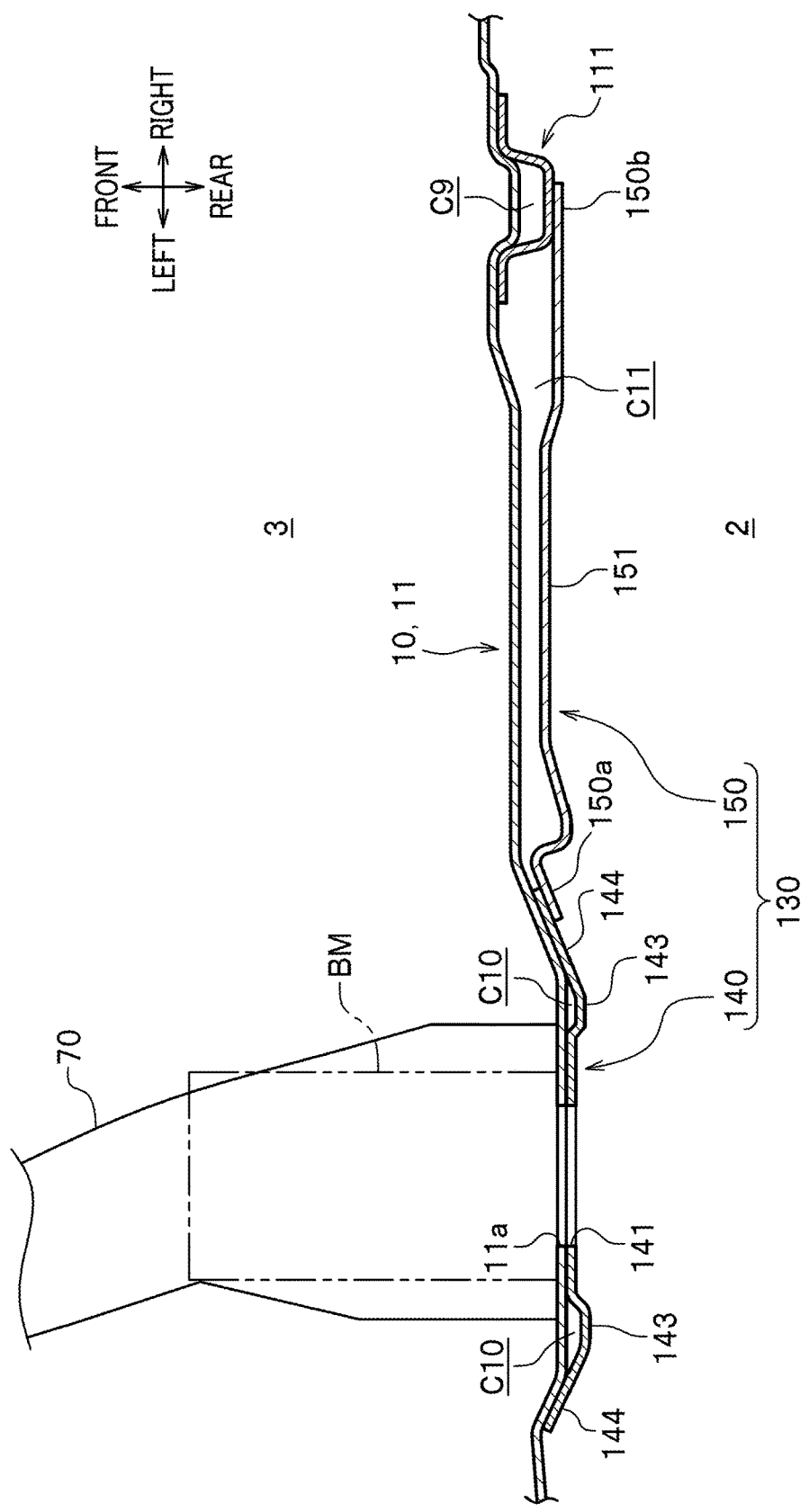
FIG. 23 is a horizontal cross-sectional view taken along a line XXIII-XXIII of FIG. 22.
Figure 24:
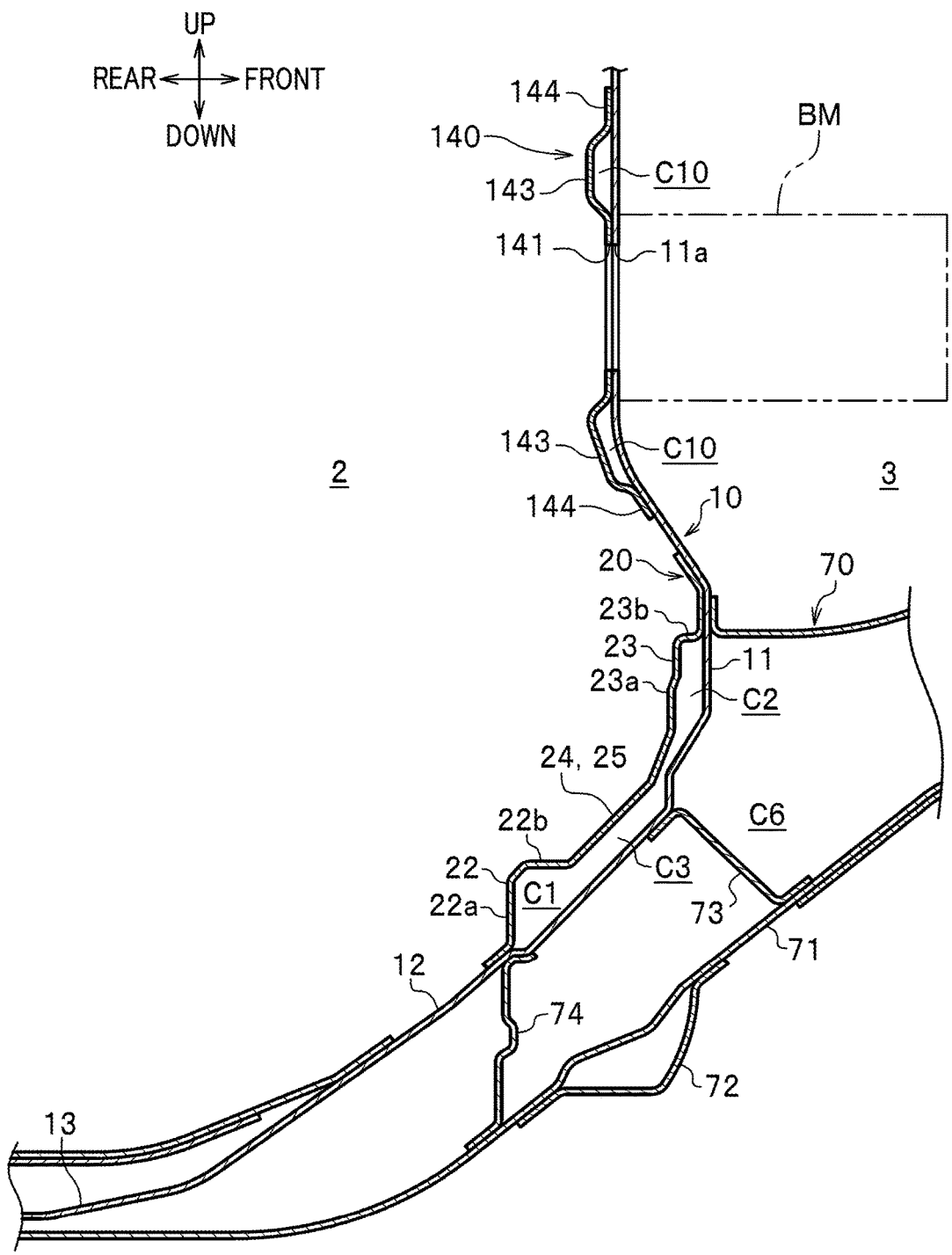
FIG. 24 is a vertical cross-sectional view taken along a line XXIV-XXIV of FIG. 22.

As shown in FIGS. 22 to 24, the upper left lateral member 130 which is one of the upper lateral members 120 further includes a master cylinder mounting bracket 140 disposed on the outer side (left side) in the vehicle width direction and a brace 150 connecting the master cylinder mounting bracket 140 and the left vertical member 111.

The master cylinder mounting bracket 140 is a member on which a brake master cylinder BM for supplying brake fluid to a brake is mounted. The master cylinder mounting bracket 140 has a substantially rectangular shape with rounded corners in rear view, and is formed by bending or punching a high-tensile steel plate into a predetermined shape, for example, by press molding. The master cylinder mounting bracket 140 has a circular through-hole 141 formed in the central portion, four boss portions 142 provided around the through-hole 141, an annular bulging portion 143 annularly surrounding the through-hole 141 and the boss portions 142, and an annular flange 144 outside the annular bulging portion 143.

The through-hole 141 is a hole through which a part of the brake master cylinder BM is inserted to be advanced (exposed) to the side of the vehicle compartment 2. The front plate 11 has a through-hole 11$a$ having the same diameter with that of the through-hole 141 in a position corresponding to the through-hole 141 of the master cylinder mounting bracket 140. The brake master cylinder BM is provided on a peripheral edge of the through-hole 11$a$ on the side of the power source device chamber 3 of the front plate 11. The brake master cylinder BM is fastened and fixed to the front plate 11 and the master cylinder mounting bracket 140 by bolts (not shown) inserted through the four boss portions 142.

As shown in FIGS. 23, 24, the annular bulging portion 143 is separated from the front plate 11 to the side of the vehicle compartment 2, and forms an annular cross-section C10 with the front plate 11. Thus, mounting rigidity of the brake master cylinder BM is increased.

The annular flange 144 is a portion joined to the front plate 11. The master cylinder mounting bracket 140 is joined to the front plate 11 also inside the annular bulging portion 143. Joint structure of the annular flange 144 will be described below.

As shown in FIGS. 22, 23, the brace 150 is a reinforcing member formed in a substantially hat shape (see FIG. 29) in a vertical cross-sectional view. The brace 150 extends horizontally from the left vertical member 111 to a substantially central portion in a longitudinal direction of the brace 150, and is bent and extended to be located higher toward a left end 150$a$ from the substantially central portion. The brace 150 has a brace bulging portion 151 extending in the longitudinal direction and an extending portion 152 extending downwardly from the substantially central portion in the longitudinal direction. The left end 150$a$ of the brace 150 is joined to the master cylinder mounting bracket 140. A right end 150$b$ of the brace 150 is joined to the left vertical member 111.

The brace bulging portion 151 is separated from the front plate 11 to the side of the vehicle compartment 2, to form a closed cross-section C11 with the front plate 11. The brace 150 is joined to the front plate 11 at top and bottom of the brace bulging portion 151, for example, by spot welding. The extending portion 152 is a plate-like portion extending along the front plate 11 and the inclined portion 12. Joint structure of the extending portion 152 will be described below.

As shown in FIGS. 22 to 24, the master cylinder mounting bracket 140 disposed on an outer end in the vehicle width direction of the upper left lateral member 130 which is one of the upper lateral members 120 overlaps the rear end of the front side frame 70 in the vehicle width direction (see a region Z in FIG. 22). In particular, the master cylinder mounting bracket 140 is disposed directly above the front side frame 70 (vertically offset). Since the master cylinder mounting bracket 140 increases the rigidity of the dash lower panel 10 around the rear end of the front side frame 70, it is possible to reduce vibration of the dash lower panel 10 and the front side frame 70.

Figure 25:
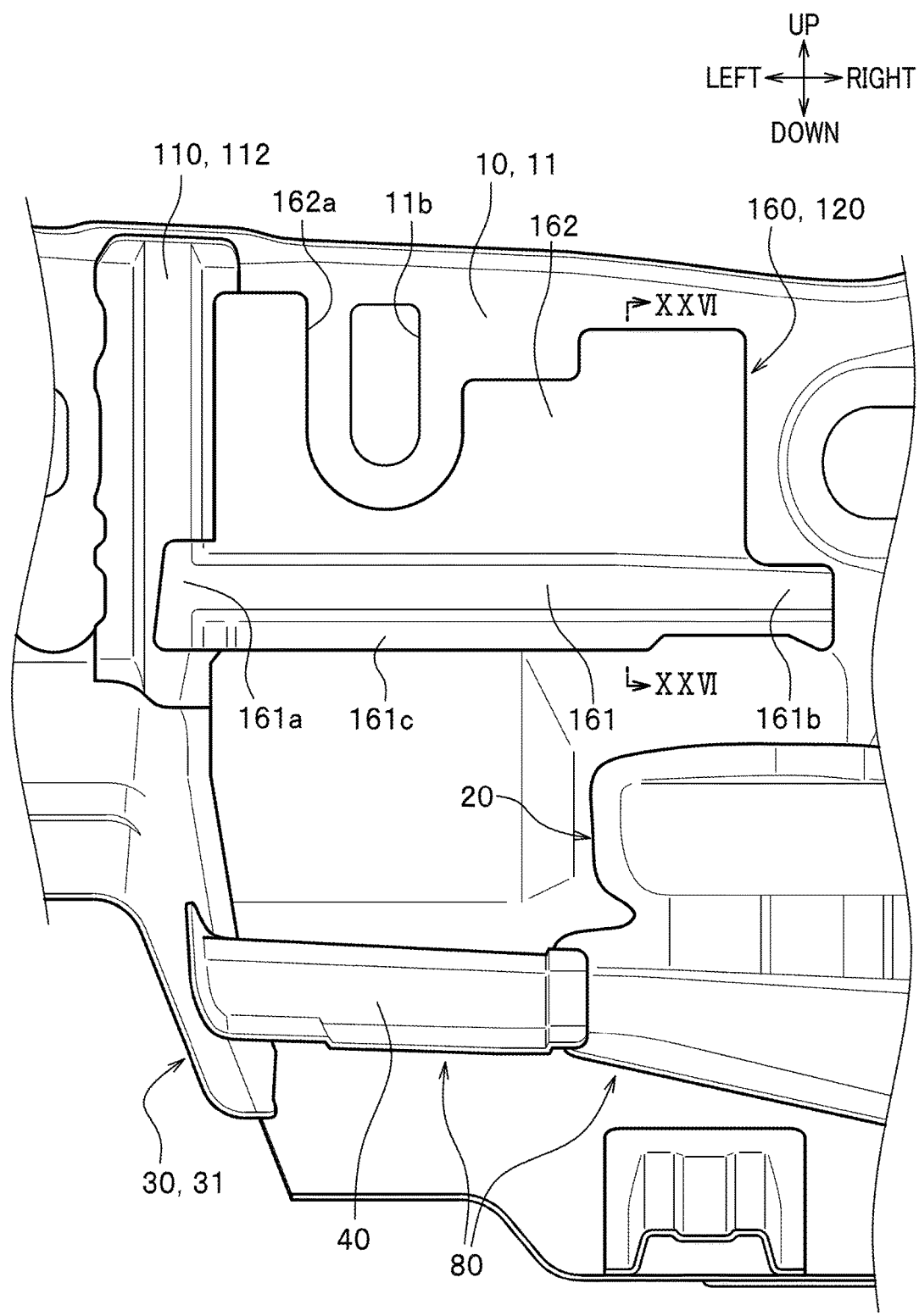
FIG. 25 is a rear view of a right half of the vehicle body structure viewed from the rear.
Figure 26:
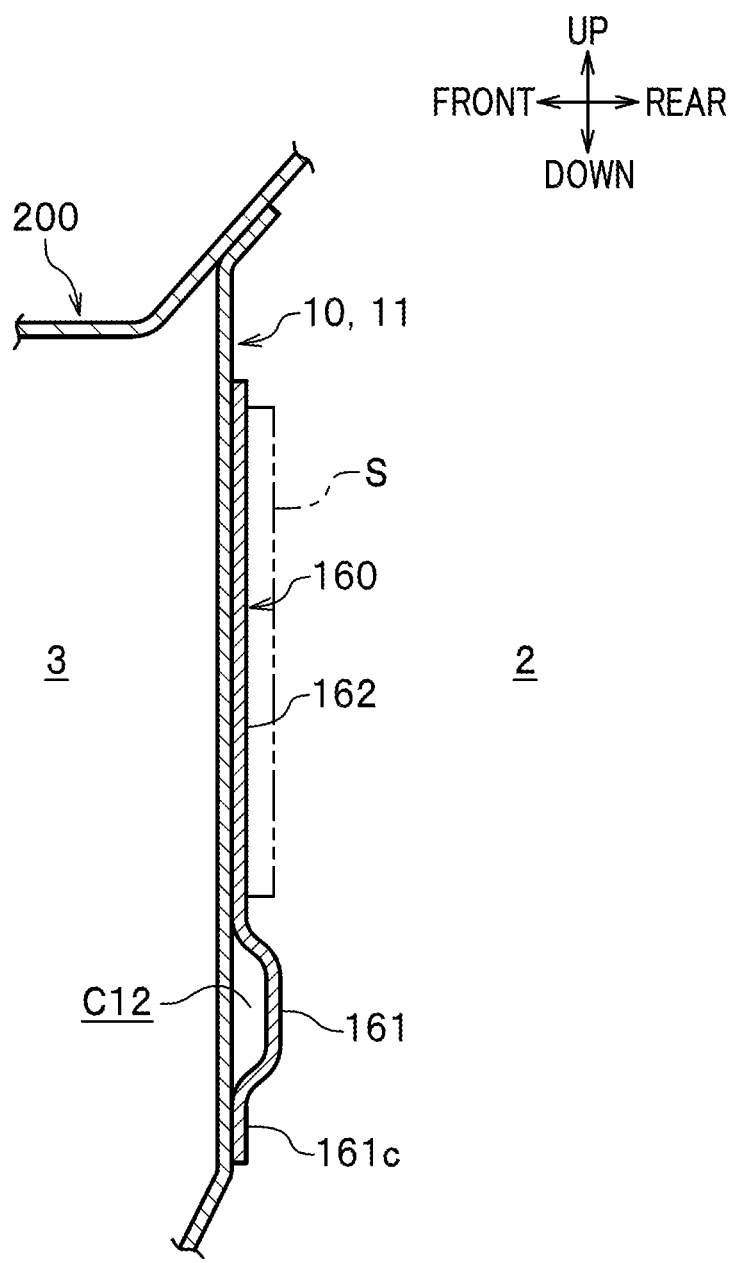
FIG. 26 is a vertical cross-sectional view taken along a line XXVI-XXVI of FIG. 25.

As shown in FIGS. 25, 26, the upper right lateral member 160 which is the other of the upper lateral members 120 has a lateral bone 161 formed in a groove shape opening to the dash lower panel 10 and extending in the vehicle width direction, and a plate-like damping portion 162 extending from the lateral bone 161 along the dash lower panel 10 and attached with a damping material S (see FIG. 26). The upper right lateral member 160 has the lateral bone 161 and the damping portion 162 formed integrally by bending or punching a single high-tensile steel plate into a predetermined shape, for example, by press molding.

The lateral bone 161 is separated from the front plate 11 to the side of the vehicle compartment 2, to form a closed cross-section C12 with the front plate 11. A left end 161$a$ of the lateral bone 161 is joined to the right vertical member 112. A right end 161$b$ of the lateral bone 161 extends upwardly of the reinforcing panel 20 on the right side. A lateral bone flange 161$c$ is provided at a lower edge of the lateral bone 161, and is joined to the front plate 11. The damping portion 162 extends from an upper edge of the lateral bone 161.

The damping portion 162 is a metallic plate-like portion and is joined to the front plate 11. The damping portion 162 has a larger area than that (projected area) of the lateral bone 161. The damping material S is attached to a surface on the side of the vehicle compartment 2 of the damping portion 162. The damping portion 162 has a substantially U-shaped cutout portion 162$a$ for avoiding an elongated hole 11$b$ provided on the front plate 11.

Figure 27:
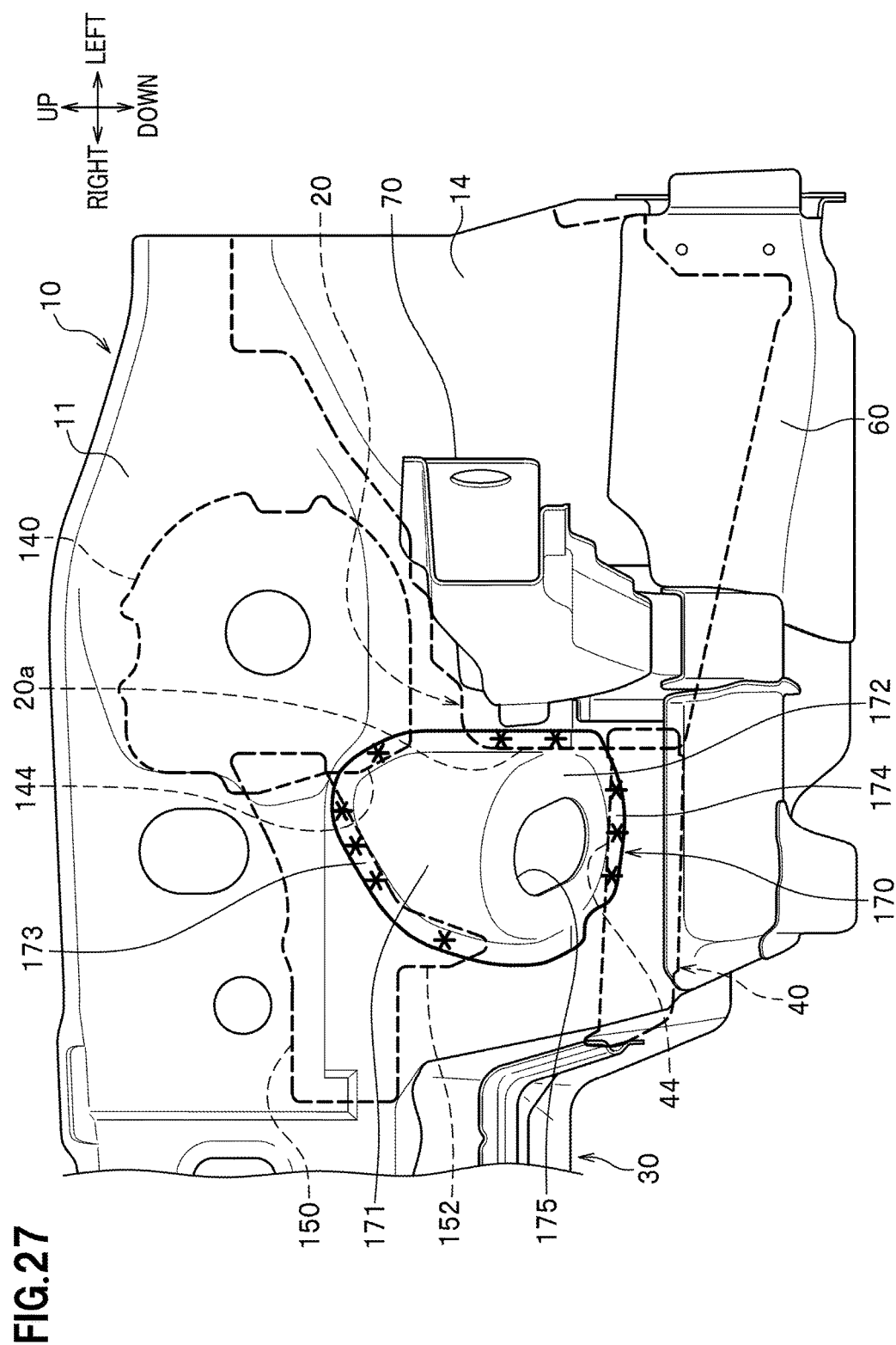
FIG. 27 is a front view of the left half of the vehicle body structure viewed from the front.
Figure 28:
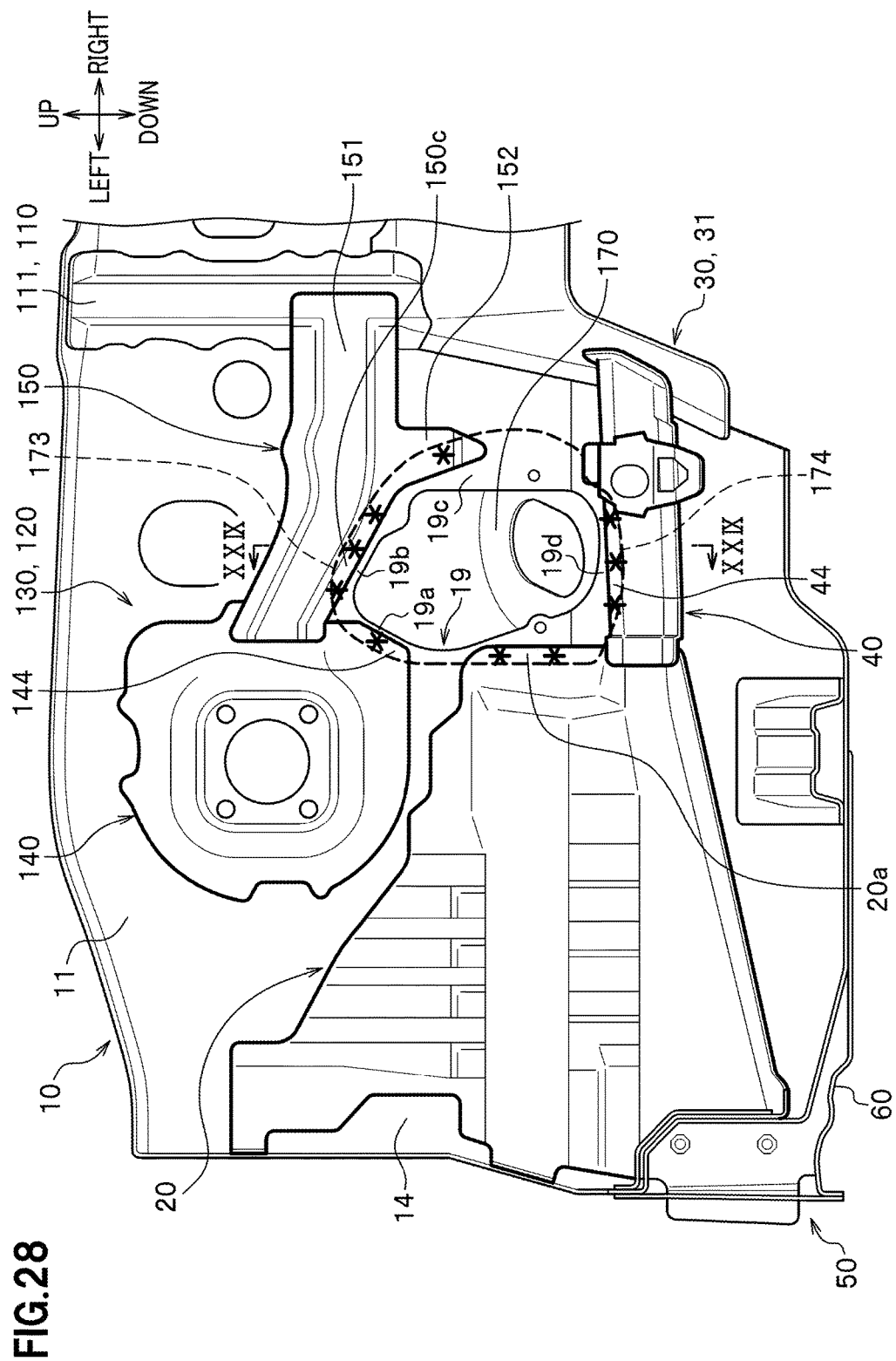
FIG. 28 is a rear view of the left half of the vehicle body structure viewed from the rear.
Figure 29:
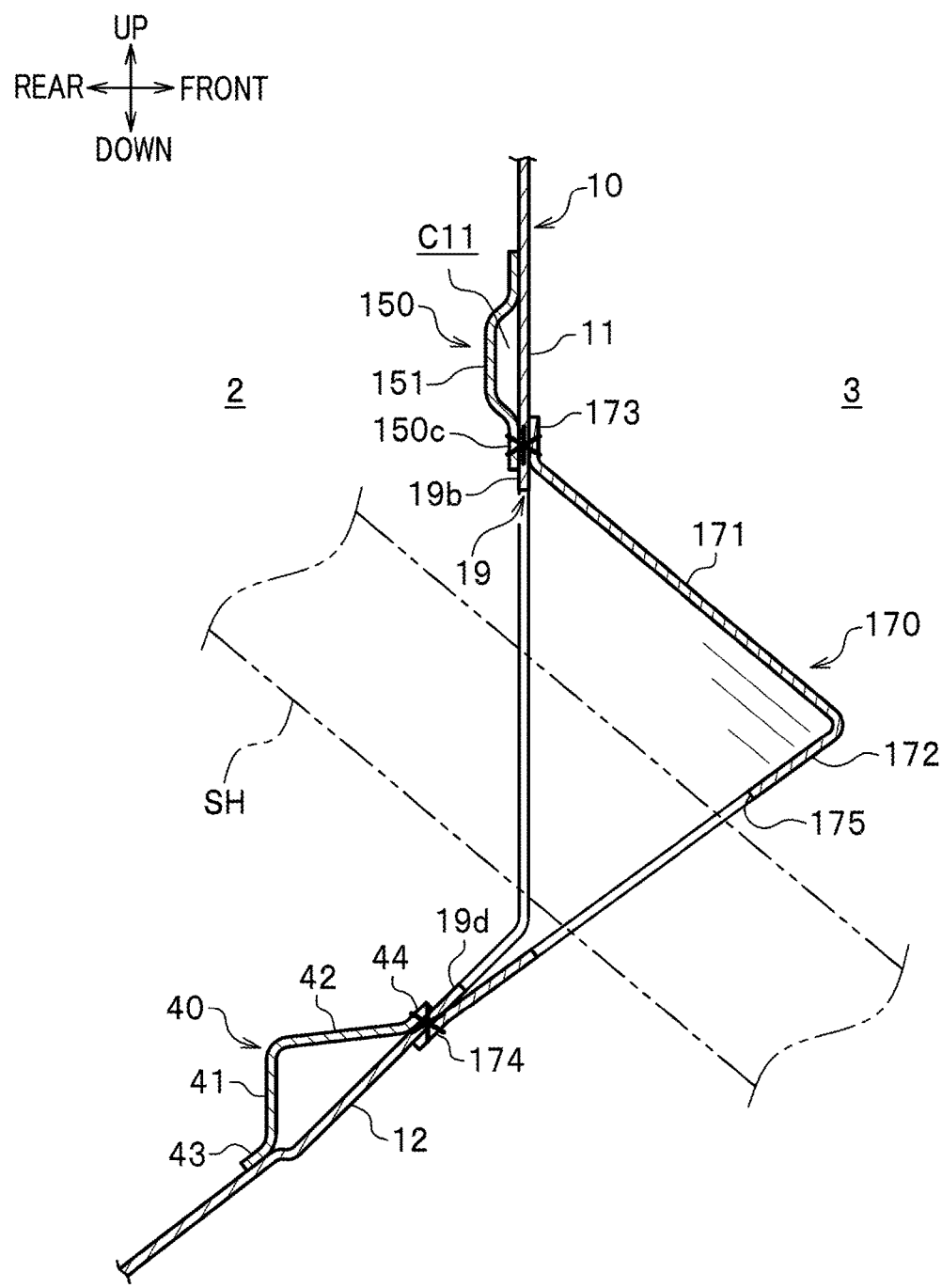
FIG. 29 is a vertical cross-sectional view taken along a line XXIX-XXIX of FIG. 28.

As shown in FIGS. 18, 27 to 29, the dash lower panel 10 has a shaft insertion hole 19 which is a through-hole for inserting a steering shaft SH (see FIG. 29). The shaft insertion hole 19 is formed between the reinforcing panel 20 on the left side and the tunnel member 30. The joint cover 170 is joined to the shaft insertion hole 19 from the side of the power source device chamber 3. Hereinafter, joint structure of the joint cover 170 will be described.

As shown in FIGS. 27, 29, the joint cover 170 is a metal member for covering a gap between the steering shaft SH and the dash lower panel 10. The joint cover 170 has a shape as obtained by cutting a cylinder at an angle, and includes a semi-cylindrical peripheral wall 171, a bottom wall 172 continuous with a lower portion of the peripheral wall 171, a peripheral wall flange 173 formed on an outer edge of the peripheral wall 171, and a bottom wall flange 174 formed on an outer edge of the bottom wall 172. An oval-shaped through-hole 175 is formed in a central portion of the bottom wall portion 172, so that the steering shaft SH is inserted therethrough.

As shown in FIGS. 27 to 29, the peripheral flange 173 is disposed to overlap a left edge 19$a$, an upper edge 19$b$ and a right edge 19$c$ of the shaft insertion hole 19 from the side of the power source device chamber 3. On the other hand, a part of the annular flange 144 of the master cylinder mounting bracket 140 is disposed to overlap an upper portion of the left edge 19$a$ of the shaft insertion hole 19 from the side of the vehicle compartment 2. Then, the peripheral wall flange 173, the left edge 19$a$ (that is, the dash lower panel 10) of the shaft insertion hole 19, and the annular flange 144 are joined together in three layers (see * in FIG. 29, the same below).

A part of a lower flange 150c of the brace 150 (portion on a left side of the extending portion 152) is disposed to overlap the upper edge 19b of the shaft insertion hole 19 from the side of the vehicle compartment 2. The peripheral flange 173, the upper edge 19b (that is, the dash lower panel 10) of the shaft insertion hole 19, and the lower flange 150c of the brace 150 are joined together in three layers.

The extending portion 152 is disposed to overlap the right edge 19c of the shaft insertion hole 19 from the side of the vehicle compartment side 2. The peripheral flange 173, the right edge 19c (that is, the dash lower panel 10) of the shaft insertion hole 19, and the extending portion 152 are joined together in three layers.

An inner end 20a in the vehicle width direction of the reinforcing panel 20 on the left side is disposed to overlap a lower portion of the left edge 19a of the shaft insertion hole 19 from the side of the vehicle compartment 2. The end 20a of the reinforcing panel 20, the left edge 19a (that is, the dash lower panel 10) of the shaft insertion hole 19, and the peripheral wall flange 173 are joined together in three layers.

The bottom wall flange 174 is disposed to overlap a lower edge 19d of the shaft insertion hole 19 from the side of the power source device chamber 3. On the other hand, the lateral member upper flange 44 of the lateral member 40 on the left side is disposed to overlap the lower edge 19d of the shaft insertion hole 19 from the side of the vehicle compartment 2. The lateral member upper flange 44, the lower edge 19d (that is, the dash lower panel 10) of the shaft insertion hole 19, and the bottom flange 174 are joined together in three layers.

In other words, the peripheral wall flange 173 and the bottom wall flange 174 of the joint cover 170 are joined to the master cylinder mounting bracket 140, the brace 150, the reinforcing panel 20 and the lateral member 40 via the dash lower panel 10. Thus, it is possible to compensate reduction of rigidity due to formation of the shaft insertion hole 19 in the dash lower panel 10, thereby improving damping performance.

Next, operational effect of the vehicle body structure 1 according to the present embodiment will be described in detail with reference to FIGS. 18 to 29.

As shown in FIGS. 18, 22 to 24, with the vehicle body structure 1 according to the present embodiment, at least the master cylinder mounting bracket 140 disposed on the outer end in the vehicle width direction of the upper left lateral member 130 overlaps the rear end of the front side frame 70 in the vehicle with direction (see the region Z in FIG. 22), and thus the master cylinder mounting bracket 140 increases the rigidity of the dash lower panel 10 around the rear end of the front side frame 70. This makes it possible to reduce vibration of the dash lower panel 10 and the front side frame 70 while suppressing an increase in plate thickness of the dash lower panel 10 and an increase in the number of attached damping materials.

As shown in FIGS. 19 to 21, the front tunnel member 31 is formed in a groove shape opening downwardly, and has the tunnel left ridge line 31f and the tunnel right ridge line 31g extending in the front-rear direction on an upper surface thereof, and thus it is possible to sufficiently reinforce the dash lower panel 10 even when the cross-sections (closed cross-sections C9) and a plate thickness of the vertical member 110 are reduced. Further, the lower end 111a of the left vertical member 111 and the lower end 112a of the right vertical member 112 are respectively abutted against and joined to the tunnel left ridge line 31f and the tunnel right ridge line 31g, and the left vertical member 111 and the right vertical member 112 are arranged separately from each other in the vehicle width direction, and thus deformation of the central portion of the dash lower panel 10 is allowed, so that steering feeling given to the occupant can be improved.

Since the master cylinder mounting bracket 140 is connected to the left vertical member 111 via the brace 150, mounting strength of the brake master cylinder BM is increased.

Since the upper right lateral member 160 has the lateral bone 161 and the damping portion 162 formed integrally, productivity and damping performance of the upper right lateral member 160 are improved.

Since the joint cover 170 is joined to the master cylinder mounting bracket 140 and the brace 150 with the dash lower panel 10 interposed therebetween, it is possible to reduce reduction of rigidity of the dash lower panel 10 due to formation of the shaft insertion hole 19, thereby improving damping performance.

Since the joint cover 170 is joined to the reinforcing panel 20 and the lateral member 40 with the dash lower panel 10 interposed therebetween, it is possible to further reduce reduction of rigidity of the dash lower panel 10 due to formation of the shaft insertion hole 19, thereby further improving damping performance.

Since the upper end of the vertical member 110 is joined to the rear inclined surface 201 located higher toward the rear of the dash upper panel 200, it is possible to suppress vibration in a vertical direction and the front-rear direction.

Although the vehicle body structure 1 according to the present embodiment has been described above in detail with reference to the drawings, the present invention is not limited thereto, and can be changed without departing from the spirit and scope of the present invention.

For example, the left member 111 and the right member 112 may be formed integrally. The master cylinder mounting bracket 140 and the brace 150 may be formed integrally.

REFERENCE SIGNS LIST

1: vehicle body structure
2: vehicle compartment
3: power source device chamber
10: dash lower panel
14: wheel arch-shaped portion
20: reinforcing panel
22: first lateral closed cross-sectional portion (rear inclined member)
30: tunnel member
31: front tunnel member
32: rear tunnel member (tunnel main body)
33: tunnel closed cross-section forming member
35: tunnel closed cross-sectional portion
36: front fragile portion
37: rear fragile portion
40: lateral member (vehicle width direction member, lower lateral member)
80: dash cross member
81: vehicle width direction member
82: rear inclined member
83: panel closed cross-section forming member
90: pedal bracket
110: vertical member
111: left vertical member
112: right vertical member
120: upper lateral member 130: upper left lateral member
140: master cylinder mounting bracket
150: brace
160: upper right lateral member
161: lateral bone
162: damping portion
170: joint cover
200: dash upper panel
201: rear inclined surface

The invention claimed is:

1. A vehicle body structure comprising:
a dash lower panel for partitioning a power source device chamber and a vehicle compartment;
a dash cross member provided on the dash lower panel and constituting a closed cross-section extending in a vehicle width direction;
a tunnel member provided at a central portion in the vehicle width direction of the dash lower panel and extending in a front-rear direction in a groove shape opening downwardly;
a vertical member extending upwardly from a front end of the tunnel member and joined to the dash lower panel;
left and right upper lateral members extending outwardly in the vehicle width direction from the vertical member and joined to the dash lower panel; and
a front side frame extending in the front-rear direction in the power source device chamber and having a rear end joined to the dash lower panel, wherein
the dash cross member has a convex shape with a central portion located forward of both ends in the vehicle width direction in plan view,
the tunnel member has a tunnel closed cross-sectional portion constituting a part of the central portion of the dash cross member, a front fragile portion provided in front of the tunnel closed cross-sectional portion, and a tunnel main body provided behind the tunnel closed cross-sectional portion,
the front fragile portion has a compressive strength that is lower than a compressive strength of the tunnel main body against a load from front, and
at least one of outer ends in the vehicle width direction of the upper lateral members overlaps the rear end of the front side frame in the vehicle width direction.

2. The vehicle body structure according to claim 1, wherein
the tunnel member has left and right tunnel ridge lines extending in the front-rear direction on an upper surface thereof,
the vertical member comprises left and right vertical members disposed separately in the vehicle width direction, and
lower ends of the left and right vertical members are abutted against and joined to the left and right tunnel ridge lines.

3. The vehicle body structure according to claim 1, wherein one of the upper lateral members comprises a master cylinder mounting bracket disposed on an outer side in the vehicle width direction and for mounting a brake master cylinder, and a brace for connecting the master cylinder mounting bracket and the vertical member.

4. The vehicle body structure according to claim 3, wherein another of the upper lateral members is integrally formed by a lateral bone formed in a groove shape opening toward the dash lower panel and extending in the vehicle width direction, and a plate-like damping portion extending along the dash lower panel from the lateral bone and attached with a damping member.

5. The vehicle body structure according to claim 3, further comprising a joint cover for covering a gap between the dash lower panel and a steering shaft passing through the dash lower panel from a side of the power source device chamber, wherein
the joint cover is joined to the master cylinder mounting bracket and the brace with the dash lower panel interposed therebetween.

6. The vehicle body structure according to claim 5, further comprising:
a reinforcing panel for covering a wheel arch-shaped portion provided on an end in the vehicle width direction of the dash lower panel from the vehicle compartment side; and
a lower lateral member connecting the reinforcing panel and the tunnel member to constitute the dash cross member, wherein
the joint cover is joined to the reinforcing panel and the lower lateral member with the dash lower panel interposed therebetween.

7. The vehicle body structure according to claim 1, further comprising a dash upper panel provided above the dash lower panel and extending in the vehicle width direction in a groove shape opening upwardly, wherein
the dash upper panel has a rear inclined surface located higher toward rear, and
an upper end of the vertical member is joined to the rear inclined surface.

* * * * *